United States Patent
O'Farrell et al.

(10) Patent No.: US 8,694,465 B2
(45) Date of Patent: Apr. 8, 2014

(54) SYSTEM AND METHOD FOR CONTEXT SENSITIVE MOBILE DATA AND SOFTWARE UPDATE

(75) Inventors: Robert O'Farrell, Woodenville, WA (US); Mark D. Kirstein, Incline Village, NV (US)

(73) Assignee: Antenna Dexterra, Inc., Jersey City, NJ (US)

( * ) Notice: Subject to any disclaimer, the term of this patent is extended or adjusted under 35 U.S.C. 154(b) by 0 days.

(21) Appl. No.: 13/036,165

(22) Filed: Feb. 28, 2011

(65) Prior Publication Data

US 2011/0302571 A1    Dec. 8, 2011

Related U.S. Application Data

(63) Continuation of application No. 12/796,277, filed on Jun. 8, 2010, now abandoned, which is a continuation of application No. 10/820,567, filed on Apr. 7, 2004, now abandoned, which is a continuation-in-part of application No. 10/764,122, filed on Jan. 23, 2004, now Pat. No. 7,366,460, and a continuation-in-part of application No. 10/764,229, filed on Jan. 23, 2004, now Pat. No. 7,238,706.

(60) Provisional application No. 60/461,588, filed on Apr. 7, 2003.

(51) Int. Cl.
*G06F 7/00* (2006.01)
*G06F 17/00* (2006.01)

(52) U.S. Cl.
USPC .......................................... 707/621; 707/626

(58) Field of Classification Search
USPC ........................................ 707/621, 626, 922
See application file for complete search history.

(56) References Cited

U.S. PATENT DOCUMENTS 6,832,373 B2 * 12/2004 O'Neill ......................... 717/171
7,162,543 B2 *  1/2007 Fischer et al. ................ 709/248

* cited by examiner

*Primary Examiner* — Usmaan Saeed
*Assistant Examiner* — Paul Kim
(74) *Attorney, Agent, or Firm* — Paul J. Sutton; Barry G. Magidoff

(57) ABSTRACT

Change management for a mobile data system having a mobile client device that shares data with multiple enterprise data sources involves receiving a communication from the mobile client device, wherein the client request is received at an application server and includes metadata that identifies one or more applications installed at the mobile client device, determining if an update package is available for the installed application, and updating the mobile client device and downloading the update package to the mobile client device.

13 Claims, 8 Drawing Sheets

SYSTEM AND METHOD FOR CONTEXT SENSITIVE MOBILE DATA AND SOFTWARE UPDATE

REFERENCE TO PRIORITY DOCUMENTS

This application claims the benefit of priority of U.S. Provisional Patent Application Ser. No. 60/461,588 entitled "Context Sensitive Data and Software Update System and Method" filed Apr. 7, 2003 and U.S. patent application Ser. No. 10/764,122 entitled System and Method for Mobile Data Update filed Jan. 23, 2004 and U.S. patent application Ser. No. 10/746,229 entitled Mobile Data and Software Update System and Method filed Dec. 23, 2003. Priority of the filing dates are hereby claimed, and the disclosures of these applications are hereby incorporated by reference.

BACKGROUND

1. Field of the Invention

The present invention relates generally to mobile computing systems and, more particularly, to management and update for data and applications in mobile computing systems.

2. Description of the Related Art

In recent years, many resources have been invested in the automation of back office and front office processes. For example, large sums of money have been spent on developing and purchasing sophisticated customer relationship management (CRM) and enterprise resource planning (ERP) systems. Although many organizations found the systems burdensome to implement and difficult to integrate with existing legacy data systems, many companies realized significant savings and efficiencies. These improvements helped contribute to widespread technology-led productivity increases.

The office process automation efforts have typically been focused on many customer-critical processes, where an organization interfaces with customers, but the efforts have largely stopped at the company front door. More recently, many organizations are striving to bring the benefits of automation to the least automated segments of their workforce: their mobile employees. These workers play a major role in a customer's perception of an organization. Currently, the extent of automation and enforced business processes for such workers has been limited to mobile computing devices such as pagers and cell phones.

Mobile computing can provide substantial benefits for an information-driven enterprise that has field staff who meet customers. For example, field staff productivity can be radically increased, and critical business processes such as ordering and service scheduling can be dramatically accelerated, by providing field staff with mobile computing devices. Many enterprises who are early adopters of such mobile computing systems have discovered that these benefits often come with a substantial cost. Some of the major difficulties faced by adopters of mobile platforms involve integration with other data in the enterprise.

Enterprise data integration issues can arise because mobile applications often come in proprietary, closed architectures that impede integration with other data systems of the enterprise. For example, data in the enterprise might be maintained in four or five different sources. Some of the data sources include CRM systems, dispatch systems, ERP systems, and financial records systems. Each of these data sources can utilize a different data architecture, format, and protocol. The data being stored and the configuration of the data and access mechanisms are constantly changing. Many mobile computing systems create an interim datastore in which data from the various sources in the enterprise is collected. In this way, data from the different enterprise data sources, each with a different data architecture and format, can be collected in a single common database. The mobile users can access the enterprise data by accessing the interim datastore, rather than the actual enterprise data sources. The interim store, however, creates data update and conflict issues of its own. Synchronization operations and other safeguards must be performed frequently, to ensure that the data in the interim datastore is a faithful copy of the data in the enterprise data sources.

In the context of data updates, the "data" can involve the mobile applications that are installed at the client devices. It is important to maintain the installed applications with updates, just as it is important to maintain the application data with current values.

It is important for mobile users to have an efficient, reliable data and application update methodology on which they can rely. The update process should not place a severe burden on the communications channels of the mobile devices, but must be capable of providing current data in a timely manner. Satisfying these requirements is complicated by the fact that mobile users can be limited by intermittent access to network data sources and typically use mobile devices with relatively modest computational power.

As a result of these difficulties and increased complexity, there is renewed emphasis on requiring mobile applications to be fully integrated with other applications and data, and to have greater functional capabilities. The present invention satisfies these needs.

SUMMARY

In accordance with the invention, change management for a mobile data system having a mobile client device that shares data with multiple enterprise data sources involves receiving a communication from the mobile client device, wherein the client request is received at an application server and includes metadata that identifies one or more applications installed at the mobile client device, determining if an update package is available for the installed application, and updating the mobile client device and downloading the update package to the mobile client device.

Other features and advantages of the present invention should be apparent from the following description of the preferred embodiment, which illustrates, by way of example, the principles of the invention.

BRIEF DESCRIPTION OF THE DRAWINGS

The advantages of the invention will become more readily appreciated and become better understood by reference to the following detailed description, when taken in conjunction with the accompanying drawings, wherein.

DETAILED DESCRIPTION

I. System Overview

The present invention provides a system in which data is utilized from multiple enterprise data sources to mobile clients executing mobile applications such that the mobile applications are integrated with the multiple enterprise data sources, and data updates and configuration changes can be distributed to and received from the mobile clients in real time, without using interim data storage. The elimination of an interim data storage facility avoids complicated synchronization and asynchronous data issues between the enterprise data sources and the mobile clients. Thus, data updates and system configuration updates for the mobile application can be communicated from the enterprise to the mobile clients, and from the mobile clients to the enterprise, in real time. No special synchronization operation is needed, as changes can be propagated through the system in real time.

II. System Platform

Figure 1:
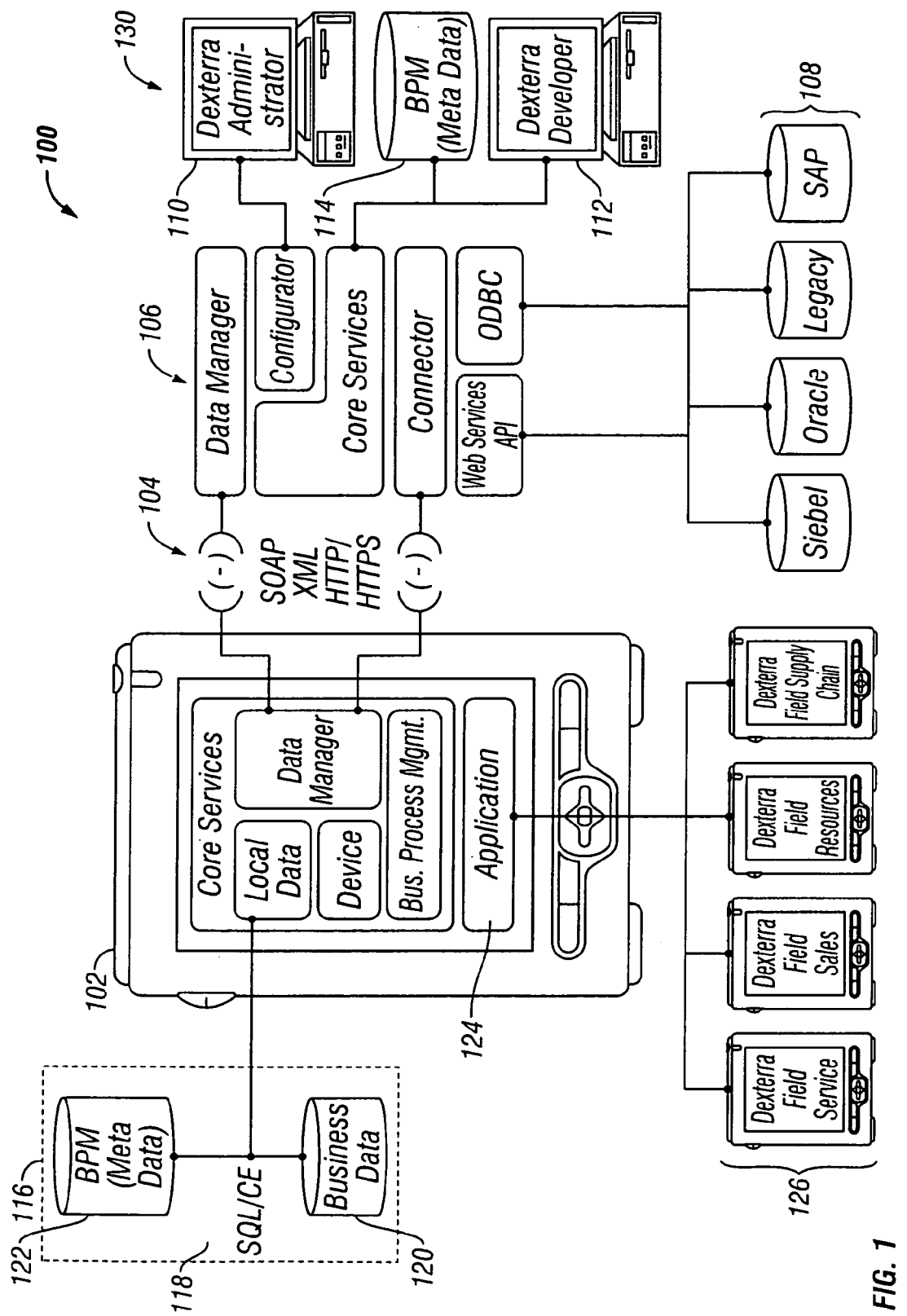
FIG. 1 is a block diagram of a suitable computer system environment for a mobile enterprise platform constructed in accordance with the present invention.

FIG. 1 is a block diagram of a suitable computer system environment 100 constructed in accordance with the present invention. FIG. 1 shows a mobile client device 102, such as a Personal Digital Assistant (PDA) device that operates in conjunction with the Microsoft PocketPC or Palm PDA operating systems. The mobile client device communicates over a network connection 104 with an application server 106 to request data from the server and receive data updates, provide new data, and receive configuration changes. It should be understood that multiple mobile clients 102 can communicate with the server 106. Only a single client device 102 is shown in FIG. 1 for the sake of drawing simplicity.

The mobile clients 102 consume the server-side connector web services for real time data retrieval from multiple enterprise data stores. Additionally, the mobile clients consume the server-side data manager web services for the management of real-time client-side data updates, server side data updates and system is configuration updates.

The application server 106 communicates with enterprise data sources 108, such as CRM data sources, ERP sources, financial system resources, legacy data stores, and the like. The exemplary enterprise data sources illustrated in FIG. 1 include data including "Siebel" software from Siebel Systems, Inc. of San Mateo, Calif., USA; "Oracle" software from Oracle Corporation of Redwood Shores, Calif., USA; "SAP" software from SAP AG of Walldorf, Germany; and legacy software. The administrator application 110 and a developer application 112 communicate with the application server 106, which also stores metadata 114 for the system, as described further below.

The application server 106 provides data manager, configuration, and data connector web services for data interchange and updating, user authentication, security, and logging services. The application server also handles business process management in the form of business information and rules.

The mobile client 102 also includes a datastore 116 that includes a relational data base 118 that stores business data 120 and also a relational database that stores metadata 122 for application execution on the mobile client. An application 124 that is installed at the mobile client 102 includes various software components that perform suitable functions. For example, the application might comprise a field service application that informs field service personnel as to a location at which service has been requested, explains the nature of the service request, and provides for logging the service visit and settling the account. The application 124 may include multiple applications that process the data requested by the mobile client 102.

The administrator application 110 and developer application 112 together comprise a "Studio" component 130. In the illustrated embodiment, the administrator and developer are provided as two separate applications, and provide a means to configure the system, including the metadata data and application interfaces.

The system 100 comprises a mobile enterprise platform that supports the service application 124. The system provides a set of Web services that effectively deploy and manage mobilized software solutions to enhance mobile business processes. Common examples include integrating to CRM or ERP, sales force automation (SFA), and customer support and help desk functions for an enterprise. Such enterprise applications depend on cross-application interaction, in that data from one function or system is often used by a different function or system. When executed on the mobile client, the existing application functionality and enterprise information is utilized among multiple enterprise software applications, legacy data systems, and mobile workers. In this way, a significant return on investment can be achieved for these applications and for the mobile enterprise platform.

The mobile enterprise platform 100 provides Web services that simplify the use of mobile clients and associated portable devices in the field. These Web services include a data manager function, a configuration function, and a connector function. These will be described in greater detail below. The applications 124 that are installed on the mobile clients 102 can be fully functional in any connected or disconnected state, after they have been properly initiated by the application server 106.

III. Logical Architecture

Figure 2:
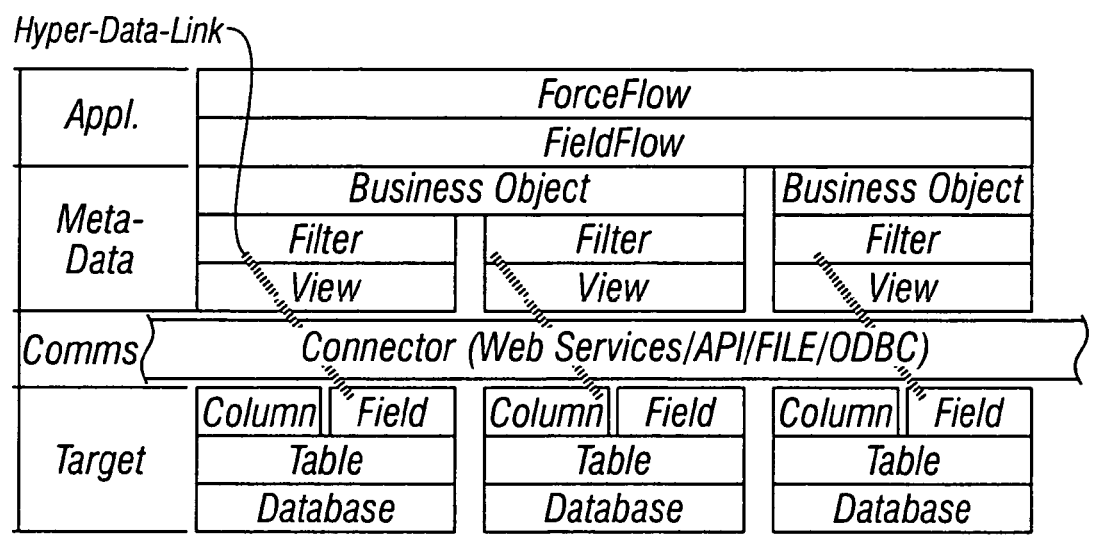
FIG. 2 is a block diagram of the logical architecture of data in the mobile enterprise platform illustrated in FIG. 1.

Any client application that makes use of the Mobile Enterprise Platform illustrated in FIG. 1 will utilize the system components illustrated in the block diagram of FIG. 2. These components include:

Business Objects—programmable objects based on business concepts, combining fields and relating information from different enterprise data sources. (e.g. data sources such as Customer, Contacts, Assets, Tasks, etc.).

Business Rules—custom logic to enforce business processes utilizing business constants with checks applied against business data from the enterprise data sources.

Business Constants—A user-configurable variable for use throughout the client applications, and client and server-side business rules (e.g. Business Rules, Warning Messages, and the like).

Datasource Connectors—data source connectors designed to seamlessly provide access to a wide variety of enterprise data sources (e.g. databases such as those formatted according to Oracle and SQL Server, messaging systems such as MQ Series or MSMQ, CRM applications such as Siebel or Peoplesoft, generic web services, and so forth).

Business Process—metaphors, such as a "Force Flow" process of Dexterra, Inc. of Bothell, Wash., U.S.A., that defines a form-to-form navigation paradigm for modeling business processes.

Forms—a combination of standard visual display screens (e.g., View, Edit, Find, and the like) with event driven logic that are designed to show information, gather information, and direct the user through a given business process, referred to herein as either a "ForceFlow" or a "FieldFlow".

Views—A modifiable representation of the data identified from an enterprise datasource or application that is utilized by one or more Business Objects.

Filters—A Filter that can be applied to a View to modify the data available to a Business Object.

These components can be used to specify the configuration (logical architecture) of any client application that is constructed utilizing a technology framework such as the Microsoft Corporation ".NET" and tools such as Microsoft Corporation's "Visual Studio .NET". Those skilled in the art will be familiar with such programming tools to specify an application and its associated data objects.

The Mobile Enterprise Platform illustrated in FIG. 1 is implemented as a metadata driven framework. The framework provides integrated client and server web services, enabling the connection, configuration, and data management services necessary to deploy fail-safe, mission-critical mobile enterprise solutions.

FIG. 2 illustrates that, in the mobile enterprise platform of FIG. 1, the structure of relational database tables and external application business objects are mapped to views as metadata. One or more views are consumed by Business Objects, also defined in metadata, which are in turn utilized by the mobile application. The mobile application utilizes a client framework, referred to as the "Dexterra Smartclient", which manages the instantiation of the Business Objects, Local Data Access to the underlying physical database that resides on the mobile client device, Device integration, as well as the client-server data communication via the data manager and/or connector web services. Within the platform, specifications for all logical layers (e.g., Business Objects, Views, Filters, and Connectors) are defined and maintained within the metadata.

The mobile enterprise platform is architected as a logical stack, designed to insulate layers in the logical architecture from all but non-adjacent members. At the bottom of the logical stack, the Target layer, is data that resides in back-end, enterprise data sources. The platform works with the source data in place, and does not require information within the back-end system of record to be replicated to a middle-tier replication database. That is, no interim datastore is needed. This provides flexibility in design, as well as real time data access and can help reduce total cost of ownership of the platform and applications, and assists simplification of data management processes.

The next layer up in the logical stack is the Connector layer. The Connector layer provides a programmatic construct that describes the back-end datastore to the application server in a relational format. The information regarding how to connect to an enterprise data source, as well as the security settings (such as authentication methods and user and group definitions) are stored within metadata, and are maintained using the Administrator component.

The next layer in the stack is the View layer, which comprises objects that provide a one-to-one mapping to an object or table in a back-end, enterprise data source. For example, if a back-end system has a table called CUST_ADDR (customer address), and data from that table is required for use in an application, then a View will be created in the Administrator component. The Administrator View might be called, for example, CUSTOMER_ADDRESS, to represent that data in the environment of the mobile enterprise platform, outside of the enterprise data sources. It should be understood that a View has properties that correspond to the properties or columns of the data object in the back-end system. However, it is not required that all properties in the back end data source are required as properties in the View. Indeed, the properties required are defined in the administrative component and stored as metadata In the example just provided, the properties might include fields such as ID, STREET_ADDR, CITY, STATE, and ZIP_CODE.

Additionally, the user can define the data types of the properties within the View, and these data types can be independent of the data types of the corresponding properties in the enterprise data source. Other options of the view properties that can be identified are unique identifier, read only, indexing, required property and length. All the above information is stored as metadata.

The View layer also provides an indication of data conflicts, and provides a means for resolving such conflicts. Data conflicts can occur, for example, whenever there are data changes between what is being uploaded from the mobile client and what exists at the server. Resolution of such conflicts can be performed at the View layer, enforcing business rules such as permitting the most recent data change to always take precedence, or permitting data changes from a particular source (e.g., either the mobile client or an enterprise data source) to take precedence depending on the data type (e.g. field data or customer account data). This is described further below, in conjunction with the Data Manager Web Service.

As illustrated in FIG. 2, the Views can be defined against multiple objects in multiple datastores, thus providing flexibility in application deployment and in the use of in-place systems, without the burden of data replication. As with the Connectors, the definitions of Views are stored in metadata, and are managed with the Administrator. Those skilled in the art will understand details of data definitions in metadata, without further explanation. As noted above, Filters can be applied to the Views, to modify the data that is passed to the next layer. The Administrator provides View management features, including a Views Wizard that automatically creates Views based upon the object interface or table definition of the back-end datastore objects (from the enterprise data sources).

The next layer up in the FIG. 2 diagram includes the Business Objects, which are mapped, or associated with, one or more Views. A Business Object of the platform is the programmatic entity with which a developer will interface with when building customizing mobile applications. The Business Objects include multiple properties, each of which can be of a simple data type, or can be another Business Object. Because the Business Objects of the platform can be mapped to multiple Views, developers can work with a single entity that represents data sourced from multiple, heterogeneous data sources. Thus, a single Business Object defined in accordance with the mobile enterprise platform of the invention can include data from multiple, potentially incompatible enterprise data sources, such as from different proprietary formats.

In creating or modifying applications for the mobile applications and mobile client devices, developers can interact solely with the Business Object layer. This insulates the developers from any requirement to understand or interact directly with the back-end systems (enterprise data sources) for the source data. In this way, the Business Object layer provides an object-based interface for application developers, abstracting the details of persistence and retrieval of data. There is no need for the developer to directly interact with the local datastore on the mobile device. In addition, due to the nature of disconnected data, the mobile client, through the Business Object interface, automatically manages the processing of data changes, by storing data changes locally in the client that will be passed to the application server during an Update process. This further insulates developers from this rote programming task.

The Business Objects exist on the mobile client device as metadata, and are to also managed using the Administrator (FIG. 1). The use of metadata throughout the mobile enterprise platform provides an environment in which the attributes and behavior of most data entities can be configured through a graphical user interface rather than coded.

The metadata-driven nature of the mobile enterprise platform enables performing business processes on the mobile client through a stateless server architecture. Through the metadata, the mobile application can be configured and customized. The metadata defines the structure of the business objects referencing the business enterprise data to the mobile device and defines the events that trigger business rules that govern the business processes.

The metadata database contains the reference of the cross-functional, cross-application back-end business information that is exposed through the Connectors to configure a business object. This process is accomplished through the Studio component (FIG. 1) to configure and reference the connecting enterprise data source business information with the Business Objects. This provides the path to the specific data for the mobile applications, ensuring that no business data from an enterprise data source is stored in its native data format on the application server or on any other interim datastore of the system for data updates. This non-invasive and real time synchronous approach using the metadata permits the mobile enterprise platform to effectively connect to back-end systems with a minimum amount of disruption while maximizing cross-functional data access, data consistency, and data integrity.

IV. Mobile Enterprise Platform Components

A. Mobile Applications

As noted above, the mobile client 102 (FIG. 1) can include installed applications 124 that implement business processes of the enterprise. The application can leverage the mobile enterprise platform described above, and demonstrates how the application instantiates the business objects which drive the business process configured in metadata.

For example, Task or Work Order information would be provided to the mobile application through views and would be accessed via a business object. In retrieval of the business data via the view definition, using the data manager web service, the business object can deliver the business data to the mobile application to describe the tasks. This data is stored on a local relational database on the mobile device. When an update to the task data is committed to the task business object in a request from the application, the Smartclient application will persist the changes to the view defined datastore on the mobile client, then the Smartclient manages the data updates back to the original data source via the data manager web service, ensuring data integrity and consistency.

By utilizing the depth, breadth, and power of web services (e.g., connection, configuration, and data manager services) that are available in the mobile enterprise platform described herein, a large suite of mobile applications can easily be constructed, including applications such as sales force productivity, customer service, and support solutions. Such applications can be integrated with a broad set of vertical applications including oil/gas, healthcare/medical and financial service industry solutions.

B. Server Components

The application server 106 is a type of metadata-driven platform application and provides information, applications, and business processes to the mobile client, and ensures managed data integrity between the mobile enterprise platform and a host of back-end enterprise data sources. The application server is a process-based, high performance solution built on the ".Net" technology from Microsoft Corporation of Redmond, Wash., U.S.A. Using the ".Net" technology, the mobile enterprise solution is a framework that is Web Services native through the use of XML and SOAP for data exchange and transport. The application server provides three core Web Services, as shown in the functional architecture diagram of FIG. 1:

Connector Web Service

The Connector Web Service delivers non-invasive integration of the existing enterprise applications infrastructure while maintaining control of the Data-Integrity Conditions between the mobile clients and the discrete enterprise data sources.

Configuration Web Service

The Configuration Web Service manages the metadata defining the is business data, business objects; business rules, business constants, and system configuration such as authentication, logging, security, and roles that encompass the mobile applications that are passed to the mobile client—the component application that is resident on the mobile device.

Data Manager Web Service

The Data Manager Web Service orchestrates the update interactions between the mobile client application, the application server, and the third-party enterprise data sources. Additionally the Data Manager Web Service provides the ability to directly communicate with the connector layer for real-time queries. The Data Manager Web Service delivers flexibility in the manner that manages the various conditions concerning multiple updates by multiple users to the multiple enterprise data sources to enforce the integrity of the data. The Data Manager Web Service can do this via the application server or direct to any API and/or third-party published Web Service.

In this way, the Data Manager Web Service can manage deployment of application updates and data changes throughout the mobile clients of the system.

Each of these components will next be described in greater detail.

1. Connector Web Service

The Connector Web Service is designed to support communication with any ODBC-compliant data source or Web Service API. The Connector Web Service allows a customer to define and build views based on data stored in one or more third-party systems. The Connector Web Service has a published interface that to allows for standard bulk updates as well as real-time data access from a mobile client.

The Connector Web Service provides the physical layer connection between the application server meta-application and the specific interface of the enterprise data sources. The connectors support database dispute management and notification services, transaction management, and error handling. In a default customer configuration, the mobile enterprise platform system is deployed to customers with an ODBC or Web Service connector. Those skilled in the art will be able to produce connectors to the most common enterprise systems, such as Siebel, SAP, PeopleSoft, Oracle, SQL Server, and the like.

For example, an "Oracle" applications connector allows a customer to make calls to Oracle support services, either through the closest data constructs the customer has to APIs (such as PL/SQL procedures) or directly to the enterprise database itself via ODBC. As with all of the ODBC connectors the dynamically interrogation of the RDBMS schema is automatically executed, exposing the specific physical design of the database. This gives the customer a hierarchical view of the actual interfaces into that system.

Figure 3:
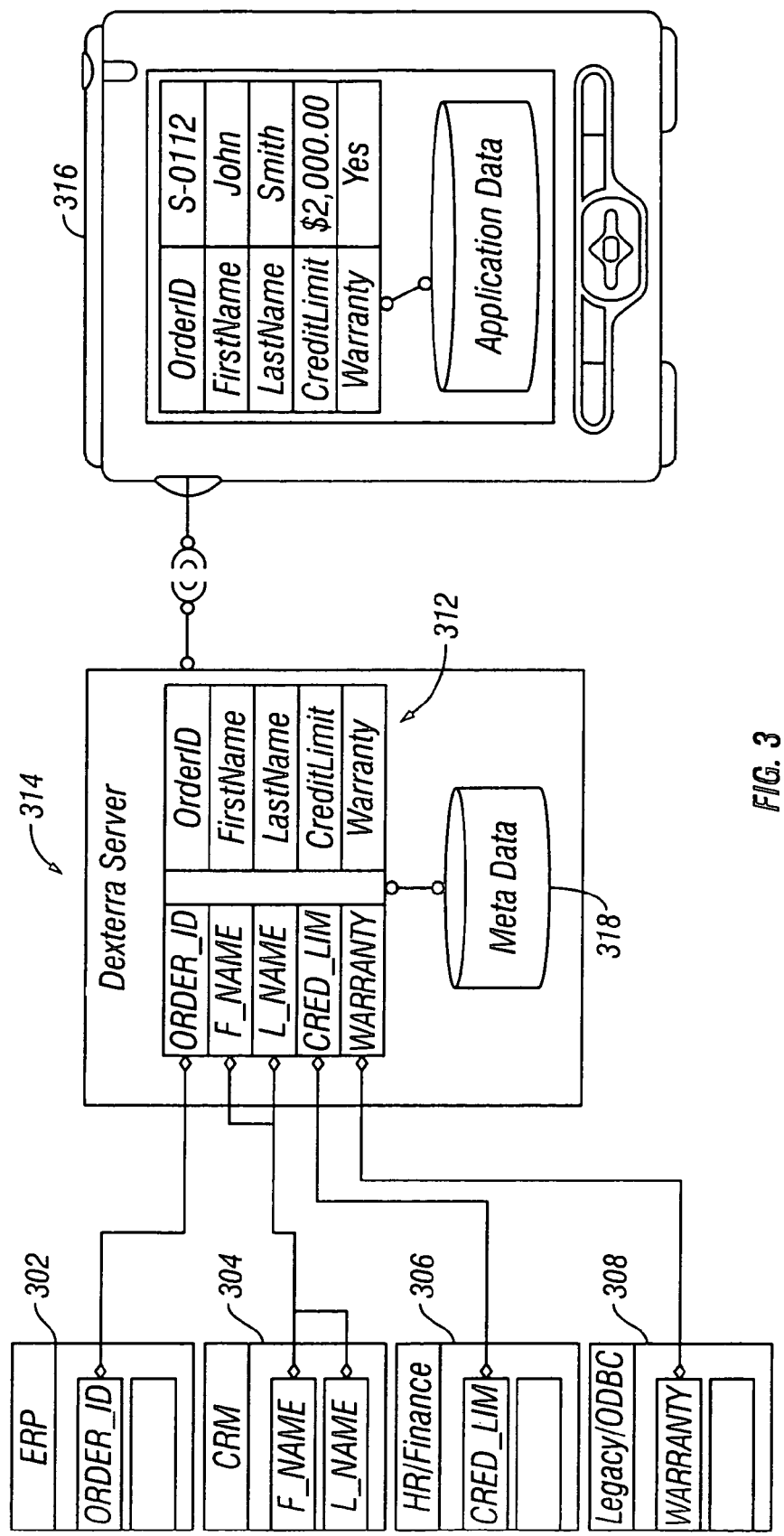
FIG. 3 is a block diagram that illustrates the Connector interface between the enterprise data sources and the mobile client of FIG. 1

FIG. 3 shows an example of how the Connectors interface the enterprise data sources to the mobile enterprise platform. On the left side of FIG. 3 are representations of multiple enterprise data sources, including an ERP data source 302, a CRM data source 304, an HR/Finance data source 306, a Legacy/ODBC data source 308, and can include other Web Services or other sources (not shown). In the middle portion of FIG. 3 is a representation of the metadata 312 that specifies to the application server 314 how data from the different enterprise data sources will be stored and related in the mobile client 316, which is represented at the right side of FIG. 3.

Thus, in this example, data identified as ORDER_ID exists in the ERP data source. Data identified as F_NAME and L_NAME exists in the CRM data source. Data identified as CRED_LIM exists on the HR/Finance data source, and data identified as WARRANTY is stored in the Legacy/ODBC data source. All of these identified data are stored in enterprise data sources, such as at back-end office systems.

In the metadata 312, the data definition from the enterprise data sources is mapped to views that are used to create the data store on the client and store the relevant business data on the mobile client from the enterprise data sources in a relational database. Access to this business data is performed via a the business object layer defined and stored in metadata on the mobile client. As shown in FIG. 3, the ORDER_ID from the ERP data source is mapped to a business'object property called Order_ID, whose relational definition is stored in metadata 318 on the mobile client 316 and utilized by one or more the mobile applications also defined in metadata. The F_NAME data from the CRM enterprise data source is mapped to (stored into) the FirstName business object property definition stored in the mobile client database, and the L_NAME data is mapped to the LastName business object property. Similarly, the CRED_LIM data from the HR/Finance data source is mapped to the CreditLimit business object property, and the WARRANTY data from the Legacy/ODBC data source is mapped to the Warranty business object property. Thus, data from the potentially dissimilar and incompatible disparate enterprise data sources 302, 304, 306, 308, 310 are delivered to the mobile client through the Data Manager Web Services to the local data store (represented by the lines from the enterprise data sources to the application server 314) in the proper format for access using one of the business objects on the mobile client (indicated in the mobile client 316 with actual values).

Connector Types

The connectors that are supported by the Connector Web Service include the following three connector types:

1. The Web Services connector is used when the mobile platform is connecting to a third-party system (a) that is either non ODBC-compliant, or (b) does not allow ODBC/RDBMS connectivity, or (c) whose interface is defined by a standard API and can be wrapped and defined by Web Service Descriptor Language (WSDL).
2. The ODBC/RDBMS connector is used when connecting the mobile platform to a third-party system (a) that is ODBC compliant and (b) allows for direct ODBC/RDBMS access and (c) whose data is located physically within the same LAN environment or accessible via a communication protocol supportive of the transport (such as RPC, TCP, etc.).
3. The API connector is similar to the Web Services Connector but (a) requires the API to be accessible via non internet protocols such as RPC and (b) is used if the Web Services Interface is not available.

Reading schema, via the ODBC/RDBMS connector, information is accomplished through the use of the Studio portion 130 (FIG. 1) of the mobile enterprise platform, using the Administrator application. The Studio portion is used to configure the View definition mapping to the backend data source and map the definition of one or more Views to one or more Business Objects. When defining the View definition or mapping the Views to Business Objects, using the administrator, the information is stored as metadata. During an update process with the application server and enterprise data source, the metadata is read to determine how to read, persist and remove the data (select/insert/update/delete functions) while managing and enforcing the data integrity using such functions as conflict detection/resolution, transactions both inherent and compensating where appropriate.

Using the ODBC/RDBMS connector, data is read, persisted and/or removed via ANSI SQL statements and/or stored procedures in the case of Microsoft Corporations SQL Server or Oracle's RDBMS (8i, 9i, etc.). Using the Web Services/API connector, data is read, persisted and/or removed by calling the appropriate API function or method for the transaction.

2. Configuration Web Service

The Configuration Web Service consumed by the Dexterra Studio provides an easy interoperable way for administrators, business analysts and developers to implement, configure, and administer the Dexterra Mobile Enterprise solution. The Configuration Web Service allows for easy manipulation of the metadata used to configure and customize the data and process definitions of Mobile applications. This service will be better understood with reference to the features of the Administrator component, which is described in greater detail below.

3. Data Manager Web Service a. Update Process Model

An update process model is utilized in the system, in which mobile applications update their locally held data (either the application or its business objects) with the backend enterprise database using a set of core ".Net" components that are exposed as Web Services for easy interoperability.

The Data Manager Web Service updates the mobile application and all its associated business objects defined data. The Update process model enables two-way data transfer between the enterprise datasources via the application server and the mobile client, allowing updates to be made while the mobile client is connected to the network, merging the updates between clients when they are connected. When in the disconnected state, updates are managed in the client environment, until a time at which a connected state is attained and the update request can be initiated.

The update process model takes the "all or nothing" approach. If a failure occurs before the entire stream is downloaded from the application server onto the mobile client (or before the entire stream is uploaded from the client to the server), then the Data Manager Web Service on the application server does not receive a confirmation on the download transaction (or upload). As a result, the server carries the intelligence to manage the client state as to whether it requires a roll back of data or simply a retry. When the mobile client performs an update process operation the second time, the application server takes into account the original information state and may either deliver the results if the application server has processed or process again in the event all the required information was never received by the application server thus enforcing the reliable deliver of information once and only once between the mobile client and application server. This, in event, enforces the integrity of the data as it moves from mobile client to one or more back end data sources.

b. Update Process Breakdown

Two types of update processing are supported:
1: Get Latest: In this update type, the mobile client makes a request to get the latest information from the enterprise data sources via the Dexterra application server. The Dexterra application server process the request and retrieves the business information from the multiple data sources using the Dexterra Connector Web Service and delivers the business information to the mobile client.
2: Update (2-way update): In this update type, records on both the client and server end are interchanged, enforcing the integrity of the data on both the mobile client and the back end enterprise data sources using Dexterra Conflict Resolution configured parameters.

c. Date/Time Stamp

Date/Time Stamp is a setting where a specific field or property is identified in a single record source as date/time stamp and updated upon any insert/update or delete and the application server will use this to determine whether data has been changed on either the back end data source or the mobile client.

Manual is a setting where there is no specific field or property to identify a conflict situation in a single record source therefore the application server compares all the field or property data to define uniqueness and detect whether data has been changed on either the back end data source or the mobile client.

d. Conflict Detection/Resolution

Conflict resolution describes the rules used to arbitrate on data conflicts caused by changes made between a mobile client and one or more back end enterprise data sources. This is performed first by identifying the conflict (Detecting and Determining the type of conflict) and then resolving (Resolution) the conflict in one or more various ways.

The application server can detect conflicts in one of three ways: Revision, Date/Time Stamp, or Manual, as well as identify a conflict situation by row or column level.

Revision is a setting where a specific field or property is identified in a single record source as revisioned and the application server will use this to determine whether data has been changed on either the back end data source or the mobile client.

Depending on configuration of the application server, Conflicts are resolved in one of four ways: First Update Wins, Last Update Wins, Admin Resolution or Server-side Rule (i) First Update Wins Under the First Update model the application server will only accept changes of any record that is the first one to make an update. If a record is first updated by the back end data source and a conflict is detected by the Update Web Service, instead of returning an error, the Data Manager Web Service will drop the version provided by the client and return a copy of the latest version of the record from the back end enterprise data source to the mobile client.

(ii) Last Update Wins

Under the Last Update Wins model, the server need not detect conflicts. Instead, it simply persists the changes from the mobile client to the back end enterprise data source overwriting the current record in the back end enterprise data source.

(iii) Admin (or Manual) Resolution

When configured for Admin/Manual resolution, the server will treat all conflicts as requiring manual intervention to resolve and will return a copy of the current record from the back end enterprise data source and optionally notify via any notification service (SMS, Email, etc.) that a conflict situation has arisen and allow for resolution via the Dexterra Administrator. Doing so allows for column level conflict resolution since the Administrator determines the values to reapply back to the back end enterprise data source selectively.

(iv) Server Side Rules

Customizable Server Side Rules can be created to determine more programmatically and specifically how certain conflict situations should be resolved. For example, a conflict may be resolved based on the values of data in a record. This flexibility allows for complete control over the specific actions surrounding a conflict resolution scenario.

e. Client Deployment from the Server

The application server contains the definition of one or more mobile field applications that are to be downloaded to the mobile client, including the Forms/screens represented as tasks (referred to as "FormFlows"), data-interactions (referred to as a "FieldFlow"), and groups of FormFlows and FieldFlows constructed into a Business Process/Workflow (called a "ForceFlow"). The FormFlows, FieldFlows, and ForceFlows are described further below. The application definition also includes the configured metadata associated to an application such as View, Business Object, Business Constants definition. Also included in the deployment is the specific business data from one or more back end enterprise data sources required to run the mobile client in an "occasionally" connected state.

The application server provides the foundation on which to deliver and manage applications and to connect to existing enterprise data sources and systems. The mobile enterprise platform applications are distributed and managed to the mobile devices, such as "Pocket PC" and "Tablet PC" devices, by the application server, providing a highly manageable administration of all user interfaces in the field.

C. Administrator Components

As noted above, the Administrator component 110 (FIG. 1) allows system administrators to perform changes that are relatively regular or frequent. The Administrator component provides access to decision variables, drop-down list content, and other information in a format appropriate for business analysts or administrators to manage. This approach to administration allows system administrators to extend many functions down to the Administrator level without compromising system integrity.

For example, data comprising business information that is used to define the business processes of the enterprise can be received through a Business Objects definition form. The Configuration Web Service provides access to this aspect of the Administrator component.

The Administrator 110 executes as part of the "Studio" portion 130 of the system (FIG. 1). Through the Administrator, a customer administrator may choose from a list of Business Objects and, for a selected Business Object, may provide a description. Properties for the selected Business Object also may be selected, from a list. In this way, an easy-to-use interface is provided for configuring and modifying the application that is installed onto the mobile devices.

The Administrator 110 also supports security management features that provide a mechanism to add and change users, integrating with existing directory services and/or LDAP or Active Directory Services in a "two tiered" security model. The security management then "authorizes" that client based on the information received in the authentication process to determine who the client identified. Thus, a high level of security is provided, because the application is secure on the client (requires username/password for access) and the downloaded data is secure on the client, and the system access (through the SQL CE interface) is controlled. There is a "device disablement" process built Into the system through the configuration desktop, and a user can be disallowed access to the device application and data. Additionally, there is a significant amount of history tracking, logging, and metrics built into the system for auditing purposes. Other models of security are supported, including IIS Authentication support and DB/third-party system level security/authentication, all over Secure Socket Layer (SSL).

The Administrator 110 also supports a configuration management scheme that permits defining Groups for which security will be managed, and permits identification of administrators for the defined Groups within a Role Based model. Finally, for each Group, a level of administrative permissions can be selected from a list. Thus, this page of the configuration service application provides a convenient means of managing security features.

Fast, efficient, reliable connectivity to existing enterprise applications and data stores is important to the operation of the system. The application server provides services for fast integration to existing enterprise data sources and installed software applications, such as Siebel systems or Oracle systems, or to custom in-house developed systems.

Through the Security Settings feature, an administrator can define a server name and access connection string, as well as corresponding mobile client information for the client datastore of such data. Other security settings can be specified through the Security Settings window, such as authentication, authorization, and synchronization data settings.

Performance monitoring is supported to allow visibility into performance of the application server and other administrative functionality. The performance monitoring includes an error logging capability. The Administrator component 110 can be used to define system performance metrics that can be selected for logging. Through the Administrator, Web Services can be selected and configured, connectors can be specified, and login and synchronization operations can be selected for tracking.

A feature of the FIG. 1 system called "Dexterra Studio Developer" allows the programmer to perform changes to the mobile application. In the illustrated embodiment, the Dexterra Studio Developer is deployed as plug-ins to the "Microsoft VS .NET Integrated Development Environment" (IDE) using Visual Studio Automation. The Dexterra Studio Developer provides professional services and engineering personnel with a robust, object oriented workspace in which to develop screens, define workflows, and create User Interface elements that enforce business rules using a common development environment and language such as Microsoft Corporation VB.NET or C#. A series of designers helps guide the user through specific steps of application development without reducing the power of this application development platform. These designers help the programmer create forms and steps that bind to the defined metadata, using the Configuration Web Service, that will interact effectively with the application server at runtime, thereby extending the flexibility and power of the system for any administrative information or back end configuration that may require more rapid or frequent change.

D. Client Components

As noted above, the client 102 (FIG. 1) in the enterprise platform architecture provides a framework in which the mobile application allows the use of role-based business processes using techniques referred to as "ForceFlow", "FieldFlow", and "FormFlow", and using Web Services, thus enabling communications between the mobile client and the application server and the enterprise data sources over a LAN/WAN network, such as the Internet, via wired and wireless connections. The mobile application running on the client devices functions in a manner that is optimized for small form-factor devices providing an exception, easy to learn user experience.

In the illustrated system, the client is an object framework that is built utilizing the ".NET Compact Framework" of Microsoft Corporation that is metadata-aware. The client component enables delivery of enterprise-class application functionality on the mobile devices, which preferably operate according to the "PocketPC" operating system or Microsoft Tablet PC operation system from Microsoft Corporation. The client component also integrates with existing "PocketPC" functionality to provide seamless integration with Calendar, Task, and Today screen functionality of the PocketPC interface. It thereby provides a stable, effective environment in which to work.

FormFlows, Field Flows, ForceFlows

Any business process tasks or steps or operations in the form of display screens are called "FormFlows". The FormFlows are used to initiate process interactions called "Field Flows" that allow the initiation of business processes, which are referred to as "ForceFlows". The FieldFlows allow launching of "out of band" ForceFlows to bring real-world elasticity to the business processes.

The FormFlows are broken into three categories: (1) Information; (2) Activity; and (3) Update. An Information FormFlow is a screen that shows information needed by a mobile user to fulfill the next logical task in the business process. An Activity FormFlow is a screen that shows something the user may need to do or perform. An Update FormFlow is a screen that is displayed when a mobile user is prompted to enter data that will be returned to the host applications (the enterprise is data sources).

A FieldFlow may be required, for example, when a part might have failed and a search of inventory databases might need to be performed to see if any matching parts or similar problems with solutions exist and are available, called a lookup, or a FieldFlow may be required when a part might need to be ordered or assigned or scheduled for delivery to the client, a FieldFlow called an update.

A ForceFlow is a business process, and therefore is a collection of FormFlows and FieldFlows. An example of a ForceFlow would be time, travel, and expense recording that is associated with a job or dispatch event.

Referring back to FIG. 2, this block diagram shows how the relationships between columns and fields in the target application are related to information In the "FormFlows" (steps in the business process represented as 'Forms" in the application) and are then associated into the ForceFlow (the business process). There can be many Business Objects in one FormFlow and potentially more than one FormFlow in any business process.

Filters allow characteristics and conditions to be placed onto the data when referenced in the mobile application. For example, data type (e.g., Date), valid types (e.g., only Monday through Friday), and any conflict conditions may be detected. Other filter characteristics and conditions can be configured.

Views define the data and storage location for use in one or more Business Objects, and the Business Object can be based on one or more Views. This allows additional characteristics to be associated. For example, a Business Object may be referred to as "Customer", which may Include standard customer details; location, contacts, inventory, and also SLA and other attributes that the application would like to classify as Customer but not held in the same Target table or even Target application.

V. Update Between Client Device and Administrator

In the mobile computing environment of FIG. 1, update operations occur between the mobile client devices 102, also referred to as Field Agents, and the fixed servers, also referred to as the application server 106 or Administrator. The Field Agents will be operating frequently without an active network connection, in an offline mode, and will then be relying on data maintained in local device memory. Nevertheless, the Field Agents can have access to corporate enterprise data, such as tasks and action items, product parts data, inventory, and the like, even from remote sites.

Remote access to enterprise data is possible because the Field Agents can work with local copies of relevant data while in an offline environment. Changes to the data can be propagated to a backend database after the Field Agents return with their mobile device back to an online mode. In the FIG. 1 system, that remote access and change propagation are implemented by utilizing the business data and business objects that are distributed from a backend enterprise database to the remote devices. That is, the remote devices maintain a local copy of the relevant database and use a synchronization operation to maintain consistency with the backend enterprise data. In this way, synchronization occurs in response to user selection of "Update All" to run Upload and/or Get Latest.

A. Synchronization Model Using Update Operations

As noted above, in the FIG. 1 system, the mobile applications synchronize their locally held data, comprising the application and its business objects, with the backend enterprise database using a set of core ".Net" services that are exposed over the Internet using Web Services techniques. The .Net and Web Services techniques provide enhanced interoperability with other Web-based applications. Those skilled in the art will be able to implement the functionality described herein using the .Net and Web Services techniques without further explanation. The requisite data for the mobile devices is determined by the metadata specified for the mobile devices.

The update operations of the mobile enterprise platform will be better understood with reference to the following description of a mobile application that comprises a field services application, such as for a field service technician (repair), with respect to communications with the application server to process business is information from enterprise data sources in real time.

Initially, at the start of a business day or initiation of a service run, an end user (the field service technician) would start the mobile application and initiate an Update operation that downloads service call dispatch information and the like. During the Update operation, the application server will ensure that the mobile client contains the application data and business information necessary for operation of the mobile application and the latest set of tasks (field service calls). As noted above, the business information might come from a variety of different enterprise data sources. The business information might include the customers to be visited, the products to be serviced, parts that might be needed for repair, and the like. After the Update operation has been performed, there is no need for a network connection (wired or wireless) for operation of the client application.

Figure 4:
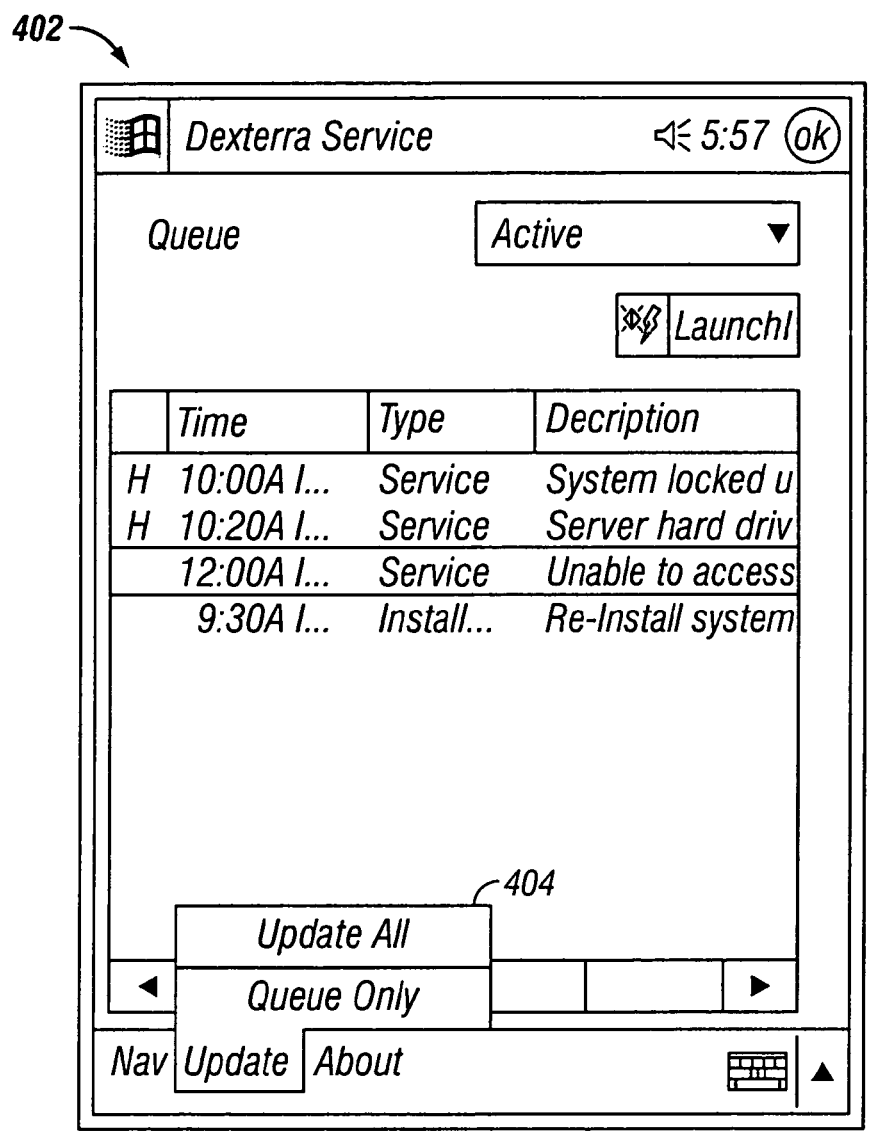
FIG. 4 illustrates a display screen for a "Queue" page that is generated at the mobile client of FIG. 1 to show update processing that results in a repair queue of customers who have requested a service call.

FIG. 4 is an illustration of a display screen 402 from the mobile client, showing a "Queue" page that is generated by the mobile application after the application is launched on the mobile device. The Queue page represents a FormFlow of the mobile application. The Queue page shows a repair queue of customers who have requested a service call. When the mobile device user selects the "Update All" display tab 404, the device initiates an Upload operation, which comprises a synchronization sequence of tasks performed by the mobile client and the application server. After the update, the Queue display page will show all the current items in the Queue and data will have been updated, as described further below. Thus, the Update operation is performed each time the "Update All" tab is selected on the Queue display page.

Figure 5:
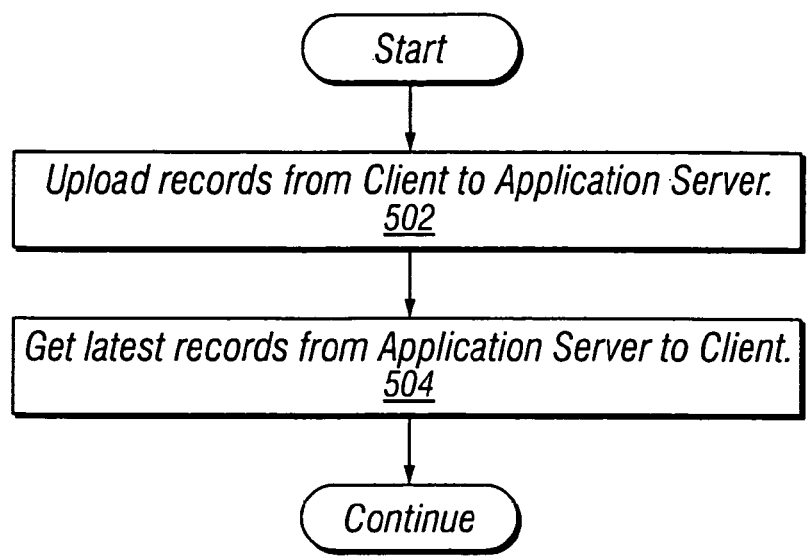
FIG. 5 is a flow diagram that illustrates an update process performed by the system illustrated in FIG. 1 for "Upload" and "Get Latest" processing.

FIG. 5 is a flow diagram that illustrates the Upload operation performed by the system illustrated in FIG. 1 in response to the "Update All" 404 selection to to execute the synchronization tasks. FIG. 5 shows that the synchronization update tasks include "Upload" processing 502 and "Get Latest" processing 504. FIG. 5 shows that the Upload processing uploads, from the mobile client 102 to the application server 106 (FIG. 1), all the data records on the mobile client that have been changed or modified since the last previous synchronization was performed. The data records for the uploaded data will be specified in terms of the metadata for the system, as described above.

After the Upload 502 is complete, the mobile device requests the "Get Latest" operation 504 from the application server. During the Get Latest operation, the latest changes to the mobile application, as well as relevant data updates, are delivered from the application server to the mobile client. As described above, the data records comprising the application changes and data updates are specified in terms of the metadata for the mobile application. The Upload and Get Latest operations are described further below.

1. "Upload" Operation

Figure 6:
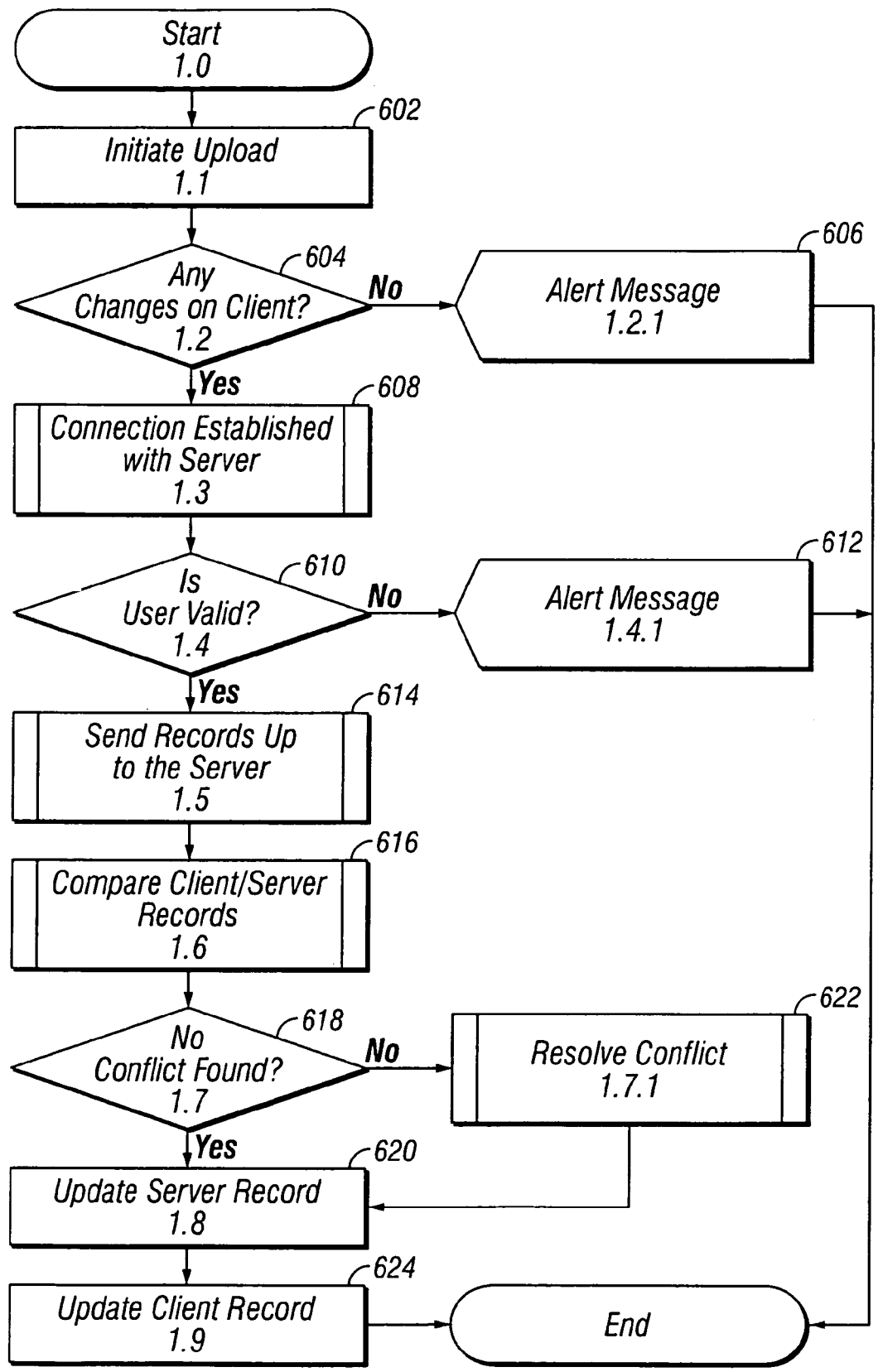
FIG. 6 is a flow diagram that illustrates operations performed during the Upload process of FIG. 5.

FIG. 6 is a flow diagram that illustrates the operations performed during the Upload process 502 of FIG. 5. The first operation in the sequence 602 occurs when the mobile device user selects the "Update All" button. As an option, the user can be presented with a choice of performing the Upload or not performing the upload as part of the Update processing. Thus, it is not required that Upload processing take place at every instance of the Update All processing. FIG. 6, however, illustrates the Upload processing that takes place upon Upload being selected by the user.

The next operation, represented by the flow diagram box numbered 604, comprises the mobile application checking to determine if there are any changes in the client-stored data record since the time of the last synchronization. If there are no changes, a "No" outcome from the decision box 604, then an alert message is provided to the user 606, indicating that there are no changes in the client record that should be uploaded to the application server. The Upload process is then terminated, as there are no further tasks to be performed.

If the mobile application determines that there are changed client data records to upload, a "Yes" outcome at the decision box 604, then a connection is established with the application server, as indicated by the flow diagram box numbered 608. In the next operation, represented by the decision box 610, the mobile application determines if the current user account is valid. This operation might involve further communications and checking with the application server, or it may involve checking stored data in the client. If the mobile user is not verified as a valid user, a "No" outcome at the decision box 610, then an alert message is displayed to the user, indicating that the user account is not valid, and the Upload process is terminated, because the mobile user does not have permission to carry on further operations. The "No" operation is indicated at the flow diagram box numbered 612. If the mobile user is verified as a valid user, a "Yes" outcome at the decision box 610, then at box 614 the changed mobile user records at the client device are sent from the mobile device to the application server.

After the changed records are received, the system checks for conflicts in the changed data. This operation, represented by box 616, involves the application server comparing the data records received from the mobile device with the corresponding data records at the application server, or with the third party enterprise data sources. More particularly, the client sends the server the original data record and the changed current status (value) of the data record. The server compares the received original data record and current data record from the client along with the data record at the enterprise data source. This will identify any conflicts between the three.

At the decision box 618, the application server checks for any conflicts between the uploaded client-changed data and the corresponding source data. In the FIG. 1 system, the application server utilizes one of three conflict detection schemes: Revision, Timestamp, or None. As described in greater detail below (see Section V.B, Conflict Detection and Determination), a data conflict arises when two data records having the same primary key contain inconsistent data on the same field. During the upload synchronization process, the application server compares data records received from mobile clients against data in the third party enterprise data sources. A conflict can arise, for example, if a mobile client changes a customer telephone number and synchronizes (uploads) the change to the application server, which then updates the corresponding data record at the enterprise data source. At a later time, another mobile client changes the telephone number of the same customer and attempts to upload that new data to the application server. The application server will receive the data change from the second mobile client, and will recognize that the new data is different from the data originally stored at the enterprise data source and also is different from the data received from the first mobile client, which also was different from the data previously stored at the enterprise data source. This is a data conflict situation, because the application server must now decide how to choose which mobile client's data to keep (synchronize) at the enterprise data source. Before data resolution can occur, the system must first detect that a conflict exists and must also determine what type of conflict is involved, either in a data table row or a data table column. That is, if there are any conflicts detected, the application server next determines whether the conflict has occurred at the row-level or at the column-level. Conflict determination is described in greater detail below at Section V.B, Conflict Detection and Determination.

If there are no data conflicts identified during the Upload operation, a "Yes" outcome at the decision box 618, then at box 620 the application server updates the data records at the application server to indicate that there are no conflicts. If data conflicts are identified, a "No" outcome at the decision box 618, then at box 622 the application server resolves those conflicts, as described further below, and then processing continues at box 620, where the application server data records are updated to indicate the resolved data as being the correct, current data records. After the application server data records are updated at box 620, the application server returns any updated data records to the mobile device at box 624. This concludes the Upload processing. Thus, the server only sends back updated data records, if need be. That is, if any data conflicts are resolved in favor of the data that was received from the client, then the client will not receive back such data. If a conflict is resolved to a data record state different from that received from the client, then the client will be sent back that updated data record, to replace the data previously maintained by the client. For example, if a data record at the client was originally with a value of "A" but was changed by the user to "B", then "A" and "B" will be sent to the server. If the value of the data record at the enterprise data source is "C", and if the server resolves that conflict to "C", then the client will receive back "C" as a replacement value. If the conflict is resolved to "B", then the client will not receive back the data record.

2. "Get Latest" Operation

The Upload processing described for FIG. 6 was to propagate changes from the mobile client to the application server. As part of synchronization (Update All) processing, changes to the mobile application itself and to relevant application data are propagated from the application server to the mobile client. This application server-to-client update is achieved through the Get Latest processing.

Figure 7:
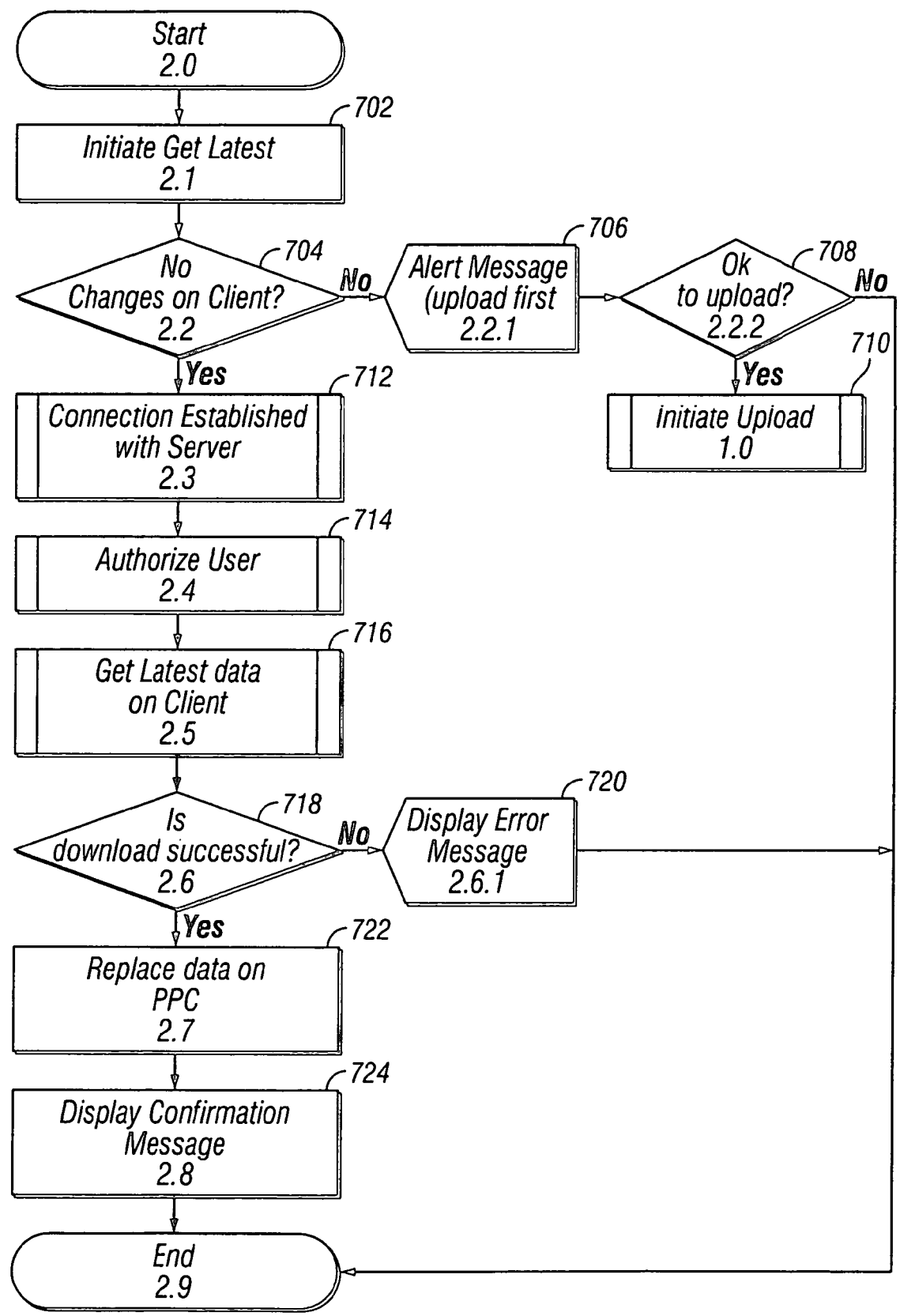
FIG. 7 is a flow diagram that illustrates operations performed during the Get Latest process of FIG. 5.

FIG. 7 is a flow diagram that illustrates operations performed during the Get Latest processing 504 of FIG. 5. The first operation, represented by the flow diagram box numbered 702, occurs when the mobile device user selects the "Update All" button. As an option, the user can be presented with a choice of performing the Get Latest sequence or not performing the Get Latest sequence as part of the Update processing of FIG. 5. Thus, it is not required that Get Latest processing take place at every instance of the Update All processing. FIG. 7, however, illustrates the Upload processing that takes place upon Get Latest being selected by the user.

The next operation, represented by the decision box numbered 704, comprises the mobile application checks with the application server to determine if there are any changes in the mobile application or in application data stored in the mobile device. If there are any changes that should be propagated to the client, a "Yes" outcome at the decision box 704, then an alert message is displayed at the mobile device (box 706) to inform the user that all user data changes should be uploaded before server-side changes are received. The alert message at box 706 involves asking the user to respond to a query (decision box 708) that will initiate a user-change data upload operation. If the user does not wish to initiate an Upload operation, a "No" response at the decision box 708, then the mobile application will terminate the Get Latest operation, because the server-side updates cannot be received until user changes are first sent to the server. This ensures proper conflict resolution, in the event that conflict occurs. If the user authorizes an Upload operation, a "Yes" response at 708, then the Upload operation is performed at box 710. The Upload operation 710 corresponds to the process illustrated in FIG. 6. After the Upload operation concludes, the client device changes have been uploaded and operation continues at box 712.

The flow diagram box numbered 712 is reached if there were no client changes, a "Yes" outcome at the decision box 704, or if client changes were successfully uploaded at box 710. For the box 712 operation in the Get Latest processing, a connection is established between the client mobile device and the application server. Next, at box 714, the client user is authorized by the application server. User authorization involves checking administrative records to identify the applications installed at the client mobile device and to ensure that the client is authorized to receive updates and changes. After this verification processing is complete, the next operation is to obtain the latest updates and changes for the client device. This is implemented by executing "Get Latest" processing to retrieve the latest data from the third party enterprise data sources through the application server, as represented by the flow diagram box numbered 716. As noted above, such processing is carried out using SOAP and Web Services programming techniques.

At the decision box 718, the application server communicates with the client device to confirm that the entire SOAP package with the "Get Latest" data was successfully received at the client device. If the application server does not receive an acknowledgment from the client device that confirms successful receipt of the data package, then the download was not successful. This result comprises a "No" outcome at the decision box 718, in which case an error message is displayed at the mobile device (indicated by the box 720) to indicate an unsuccessful download, and then the Get Latest processing is terminated. If the application server receives an acknowledgment of successful data receipt, then the SOAP download was successful, a "Yes" outcome at 718, and then at box 722 the mobile application replaces the previously existing data in the client device with the downloaded changes. Next, at the flow diagram box numbered 724, a confirmation message is sent from the application server to the mobile device, confirming that the downloaded changes were successfully received and were installed. The Get Latest operation is then concluded.

3. Conflict Resolution

Figure 8:
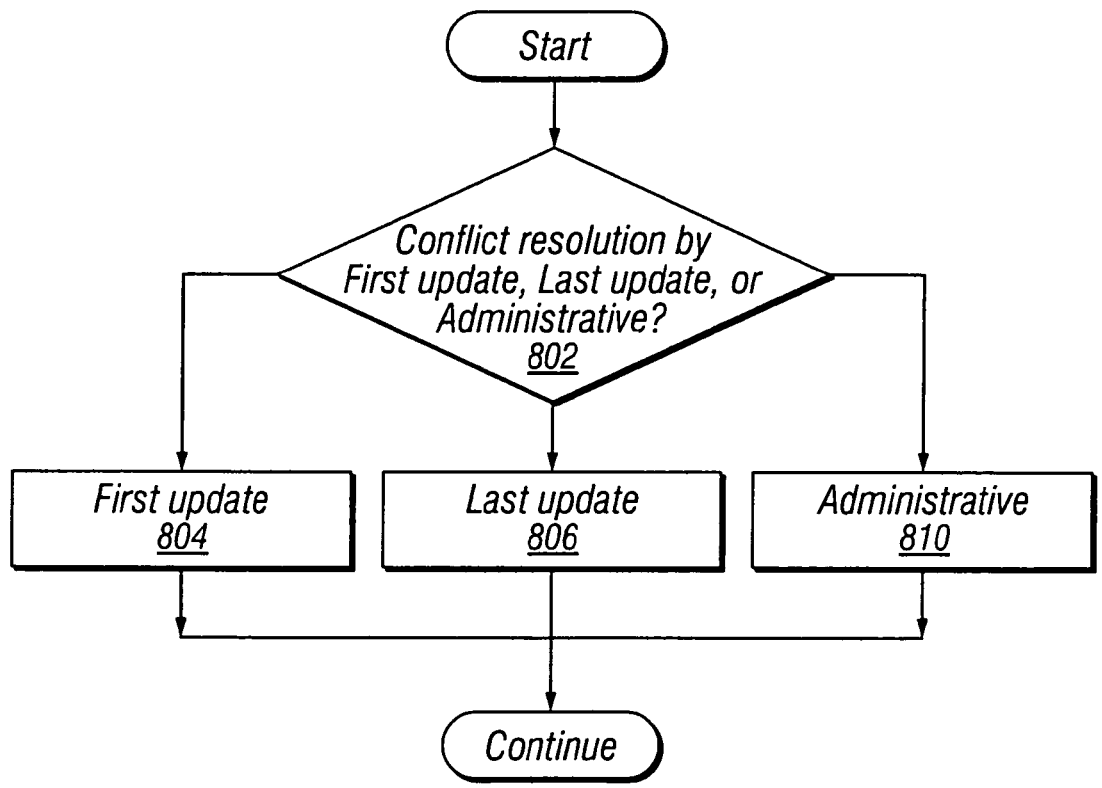
FIG. 8 is a flow diagram of a conflict resolution process that is performed during the Upload processing of FIG. 5.

During the Upload process (FIG. 6), it is possible for data conflicts to occur between data records at the application server for the enterprise data sources and data records received from the mobile device. FIG. 8 is a flow diagram that illustrates the various schemes employed in the FIG. 1 system to resolve any data conflicts during Upload processing. In the FIG. 1 system, data conflict resolution occurs using either a First Update, Last Update, or Administrative technique. This is illustrated in FIG. 8 by the decision box numbered 802. When a data conflict is detected and its type (row or column) is determined, the application server will use either the First Update 804, Last Update 806, or Administrative 808 conflict resolution technique, according to which technique has been selected during initial configuration of the application server (or as subsequently modified at the Administrator component 110 shown in FIG. 1).

a. First Update Wins

Under the First Update conflict resolution process 804, the application server will only accept changes of a data record if the source of the data change is the first to make an update. That is, data changes with respect to an enterprise data source that are received from the first mobile client to send the change to the server will be accepted, but changes received thereafter from other mobile client devices will be ignored. In addition, if a record is first updated by the back end enterprise data source and a change is later received from a mobile client, then a conflict will be detected by the Update Web Service, and instead of returning an error, the Data Manager Web Service will drop the version provided by the mobile client and will instead return a copy of the latest version of the record from the back end enterprise data source to the mobile client.

b. Last Update Wins

Under the Last Update conflict resolution process 806, the application server will accept the last version of a client data change, as provided by an mobile client. As a result, for Last Update processing, the application server simply accepts the last data version provided by any mobile client, and overwrites any previous changes to the data that might have been made. Therefore, if the application server is configured to operate according to the Last Update technique, then the conflict detection operation (see box 618 processing description above) is not needed and is not performed. That is, the application server simply persists the data changes from the mobile client to the back end enterprise data source, overwriting the current record in the back end enterprise data source.

c. Administrative (or Manual) Resolution

When configured for Administrative/Manual data conflict resolution, the application server will treat all conflicts as requiring manual intervention (such as from an administrator) to resolve, and will return a copy of the current data record from the back end enterprise data source and optionally notify via any notification service (SMS, Email, etc.) that a conflict situation has arisen and allow for resolution via the Dexterra Administrator. Doing so allows for column-level conflict resolution, because the Administrator determines the values to reapply back to the back end enterprise data source selectively.

As an adjunct to the Administrative processing, the application server can be configured to operate with Customizable Server Side Rules, to determine more programmatically and specifically how certain conflict situations should be resolved. For example, a conflict may be resolved based on the values of data in a record. This flexibility allows for complete control over the specific actions surrounding a conflict resolution scenario. As described above (FIG. 6), after the conflict is resolved according to one of the techniques 804, 806, 808, the Upload processing is continued.

B. Conflict Detection and Determination

As noted above, during the Upload operation, the application server will perform conflict detection, conflict type determination, and resolution. The application server will detect data conflicts by using a revision or a timestamp methodology, and will determine whether the data conflict is a row-level conflict or a column-level conflict. The application server will resolve any conflict using either a First Update Wins methodology, or a Last Update Wins methodology, or an Administrative resolution methodology. The application server operates according to the choices listed in Table 1 below:

TABLE 1

| Conflict Handling options | | | |
|---|---|---|---|
| DETECTION | Revision | Timestamp | None |
| DETERMINATION | Row-level | Column-level | — |
| RESOLUTION | First Update | Last Update | Administrative |

1. Conflict Detection

More particularly, conflict detection refers to identifying whether a conflict has occurred. When the application server is configured, the application server can be selected to operate with either revision or timestamp conflict detection, or none at all.

a. Revisioning

Revision conflict detection can be selected because each of the data tables in the FIG. 1 system storing business data from the enterprise data sources will include a revision number column, with a revision number for each row. When a mobile client updates a data record, it does so without altering the revision number for the data record. When the data record is returned to the application server processing, the revision number provided by the mobile client is compared to the revision number in the corresponding enterprise data source table. If the revision numbers are equal, then the update operation can proceed. If the revision numbers are not equal, then another mobile client has already updated the data record and the new data from the present mobile client has become "stale" (has been superceded).

If it is desired to detect data conflicts on a column-by-column basis, then the mobile clients must provide the original copy of the data record, in addition to the updated data. The application server can then use the original data record as a baseline to only consider conflicts where the client has modified previously updated columns.

b. Timestamp

If the application server has been configured to use the "timestamp" conflict detection methodology, then a timestamp column that is provided with every data record sent from a mobile client to the application server will be used as the basis for deciding which update, as between two mobile client updates, was applied most recently. A standardized reference is used as a time reference, such as the application server time clock. When the application server receives a mobile client update, it compares the client data record with the "master" data record at the application server from the enterprise data source and checks to determine the relative value of the timestamps from the respective data records. If the original data record at the application server contains a more recent timestamp value, then another mobile client has updated the data record and the mobile client data currently being checked contains stale data. As with the Revisioning scheme, if it is desired to detect data conflicts on a column-by-column basis, then the mobile clients must provide the original copy of the data record, in addition to the updated data. The application server can then use the original data record as a baseline to only consider conflicts where the client has modified previously updated columns.

c. None

If the application server is configured for a "None" operation scheme for data conflicts, then the mobile client must provide two versions of every record being updated: the original record that was received from the application server, and the modified data record. The application server can then compare the columns of the original data record (as received from the mobile client) with those of the data records in the enterprise data sources to determine if another mobile user has updated the data record. Even if another user has updated the data record, the application server can be configured so that conflicts are only considered if the mobile client has modified a column that has been updated previously. If the mobile client has only modified columns that have not been previously modified, then the update operation will continue.

2. Conflict Determination

Conflict determination refers to determining where in a data table a change has occurred, after a data conflict has been detected. A data change can occur at either the row level or at the column level. In the FIG. 1 system, the application server is defaulted to determine change at the row level, but the application server can be configured to determine change at the column level.

a. Row Level Conflict Determination

For determining conflicts at the row level, the application server will recognize changes made to the same row of data records having the same primary key, from two different mobile clients, as being in conflict, whether or not the changes are made to the same column. For example, suppose a first mobile client "A" changes the address column of a table row numbered "11" (that is, the primary key is 11) and then uploads this change to the application server. Next suppose that a second mobile client "B" changes the telephone information for that same row of the data table (primary key is 11). Although the data changes have been made to different columns, the same row (primary key is 11) has been altered. At the row level, when the second client of this example (Client "B") attempts to synchronize (upload) data changes to the application server, the application server will determine that a conflict exists on the same row.

b. Column Level Conflict Determination

For determining conflicts at the column level, the application server will recognize changes made to the same column of data records. The columns of two data records being checked for conflict will be examined column-by-column for any changes. For example, suppose a first client (Client "A") changes the address for a particular row of a data table and synchronizes those changes with the application server. Also suppose that a second mobile client (Client "B") uploads its updated telephone number for the same data record. When the application server compares the two data records using the column-level conflict determination, the application server will recognize that although a data change has occurred on the same row, the changes exist on two different columns. For the example, the application server would determine that there is no conflict, and therefore the application server would accept both changes.

Thus, updates of customer business data as between mobile clients and the application server are achieved with the application server using the Synchronizer Web Service to synchronize the mobile device application and all its associated business objects. In this way, the mobile applications in all the mobile clients of the system can rely on a single, consolidated database.

VI. Data Exchange Between Multiple Data Sources and Mobile Clients

As described above, the mobile application can operate efficiently by downloading operational data when connected (wirelessly) to a network, such as the Internet. The business processes of the mobile application can be performed thereafter in a disconnected state, free of a network connection. Thereafter, data uploads can be achieved when connectivity is restored. When connected to the network, data can be received from, or uploaded to, the enterprise data sources in real time through the Connectors at the application server. The data from the enterprise data sources is never accessed directly by the mobile client and is never stored in the mobile client in its native format, but rather is stored in a relational database store of the mobile client, as configured for purposes of the mobile application.

An initial operation for the mobile client, before the mobile application itself is loaded and installed, is to make an initial request to the application server to select and download an application onto the mobile device. An application server can support and service any number of applications from field sales to field service. When a mobile client receives an application, it receives metadata and associated data files that make up the mobile application. The data is downloaded by making requests to Web Services located on the application server. Requests to Web Services are made using the Simple Object Access Protocol ("SOAP") transmitted in a standard HTTP request. The results are then returned to the device as XML using SOAP. The client device then parses the returned XML and updates the necessary data on the client device.

The mobile application metadata is stored in a (e.g., a SQL CE database file) metadata file on the mobile client device. As noted above, the metadata is the actual definition of the application and how it behaves, comprising Business Objects and associated data. As described above, Business Objects are individual components of the mobile enterprise system that are broken up into logical pieces of business such as Customers, Orders, Products, and Product Issues. A Business Object property is a specific attribute of a given Business Object such as a Customer First Name, Last Name, Address and SSN. The Business Objects also specify business rules that are individual pieces of logic applied to a Business Object to help control the behavior and state of the object, (e.g., placing an Order for a platinum Customer automatically gets overnight shipping for no charge). Other data comprises business constants data, which help control and determine the outcome and criteria for a given business rule, such as a rule where a customer type has to be Platinum, Gold, or Silver to get overnight shipping. These business constants are used in the business rules to determine the outcome. The metadata is downloaded in a highly normalized format down to the device and then inserted into the stored metadata file. This allows for quick and easy creation of the Business Objects on the fly by the mobile application.

The Customer Business Data is the actual data stored in the back-end system, which is then downloaded onto the client device and then inserted into the tables that are created in the Customer Business Data file during the creation of the Customer Data Definition. As noted above, the Customer Business Data is first converted by the connectors into an appropriate data format for storage into the relational database of the mobile client. This data gives the end-user (the field service technician) a basis on which to begin using the mobile application and to update data and download only the changes that have occurred on the application server since the last time the latest data was downloaded to the mobile application.

Figure 9:
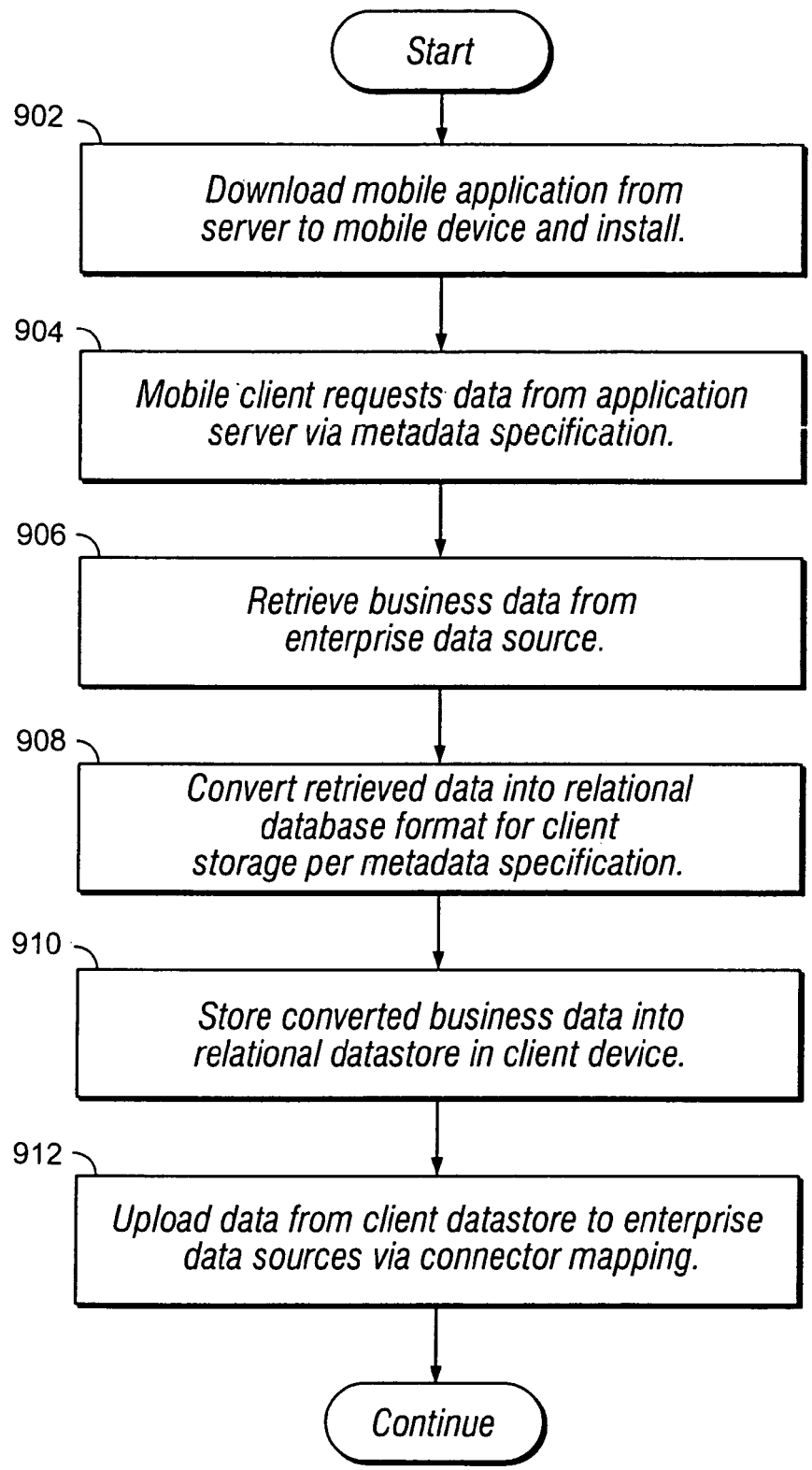
FIG. 9 is a flow diagram that illustrates operation of the mobile enterprise platform to share data between multiple enterprise data sources and mobile clients.

FIG. 9 is a flow diagram that illustrates operation of the mobile enterprise platform to share data between multiple enterprise data sources and mobile clients. In an initial operation represented by the FIG. 9 flow diagram box numbered 902, a mobile application is downloaded from an application server to a mobile client and is installed. The downloaded information will include metadata that specifies Business Objects and corresponding business rules and specifications for business processes, as exemplified by the ForceFlows, FieldFlows, and FormFlows described above.

After the mobile application is installed on the mobile client, the mobile client can operate in cooperation with the application server and the enterprise data sources of the mobile enterprise platform configuration. When an end user of the mobile client, such as a field service technician, requires business information data, the mobile client sends a request to the application server for data from the enterprise data sources. The client data request includes metadata that identifies enterprise data sources for the requested data and specifies a relational correspondence between the requested data. This operation is represented by the flow diagram box numbered 904.

In the next operation, represented by the box 906, the enterprise data is retrieved from the enterprise data sources identified as containing the requested data. This operation is performed through the Connectors and Web Services scheme of the application server. At box 908, the retrieved data is then converted into a relational database format that relates the retrieved data from the enterprise is data sources, in accordance with the relations specified by the metadata sent by the mobile client.

The converted data is then stored in a relational datastore in the mobile client, as indicated by the flow diagram box numbered 910. In the case of uploading data from the mobile client back into the enterprise data stores, the application server can apply the Connectors to map the data received from the mobile client back into the enterprise data sources for storage, as indicated by the flow diagram box numbered 912. In this way, data is shared between mobile clients and enterprise data sources without need for interim data storage, utilizing a metadata based scheme for more efficient operation.

VII. Data and Software Update in the Mobile Platform

In accordance with the present invention, context sensitive updating that balances data and software updates provides necessary information and functionality as needed, but not necessarily all information and updates available, to maintain a user in synchronization with applications and datastores that are important to the user. For the mobile computing platform described, such as illustrated in FIG. 1, "context" refers to client characteristics such as user relationship to the system (e.g., whether the client is an end user or an administrator), client state (e.g., update status), client communications availability (e.g., online or offline), and quality of mobile connection. This context-sensitive scheme for update of data and software (applications) provides for more efficient operation and a better opportunity for a positive, convenient user experience. The balancing between system resources and requirements is achieved by selecting the schema, data, and files as described above in accordance with the available resources and requirements, and modifying them as needed, through the administrative component 130 (see FIG. 1).

A. Subscription

"Subscription" is the process in which an end-user's client device 316 (see FIG. 3) makes a request to the Dexterra Application Server 314 to select and download an application onto their mobile client device. A Dexterra Application Server can support and service any number of applications, including applications from field sales to field service. The first operation in subscribing to a configured application is a request to the Dexterra Application Server 314 to determine which applications the end-user has access and permission to obtain. This may be a login operation to a secure network location, such as a Web site. Once the list of available applications is provided to the end-user, the end-user can then select any number of those applications to subscribe to, and those applications will be downloaded and installed to the client device. Thus, subscription corresponds to the first operation 902 in the update flowchart of FIG. 9.

Generally, a user who wishes to "subscribe" to one or more applications will be directed to a properly configured network location (e.g., a Web site), whereupon the user will be identified and presented with a display of applications that are available for download and installation to the user. At user selection, appropriate client framework data will be downloaded and installed to the user device for the initial installation of the selected application(s). The user can connect to any properly configured network location for any new or additional subscriptions, as often as desired.

Subscription can occur upon user initiation, when a user visits a properly configured network site, or can occur upon a disaster recovery scenario in which one or more operations in the subscription process are automatically initiated in response to a disaster recovery mode. A disaster recovery mode can occur, for example, if local datastores of application data are damaged or deleted, and only flash ROM software or firmware applications are available on the client device. A client device that is configured for disaster recovery in accordance with the invention can then prompt a user to return to the network location for subscription, or can initiate a subscription process, as desired. The subscription process will overwrite application files previously downloaded to the client device. Thus, the subscription process can be useful in disaster recovery operations or to re-initialize the installation of an application.

Authentication of users for permission to subscribe to (download and install) an application typically occurs through a validation process between client and server, such as using IIS/NTLM techniques or SOAP header authentication techniques. This is performed during the subscription process (see block 902 of FIG. 9). As noted above, access to customer business data is achieved through a validation process between server and back-end datastores (see FIG. 1). The customer business data validation occurs during business data operations (see block 904 and block 912 in FIG. 9).

When an end-user subscribes to an application, up to four sets of data are downloaded onto the client device, comprising Metadata, Customer Data Definition, Customer Business Data, and the files (assembly runtimes) that make the application run on the device. The data is downloaded by making requests to Web Services located on the Dexterra Server. Requests to Web Services are made using the Simple Object Access Protocol ("SOAP") transmitted in a standard HTTP/HTTPS request. The results are then returned to the device as XML using SOAP. The client device then parses the returned XML and updates the necessary data on the device.

Installing and maintaining an application involves two types of operations, the initial subscription process, and subsequent change management processing. As described above, the subscription process can be user initiated, or can be assisted with disaster recovery mechanisms. The change management processing occurs with each client communication to the server. That is, if a client device 316 has data to upload to a server 314, the client will send application file version data to the server with the client request for communications. The version data can include information for every application installed on the client device. The server can examine the application version number information and determine if the client device is up to date, or if application updates are available for the client device. The change management operation will be described further below.

The application Metadata is stored in a Metadata store (e.g., a Relational database file) on the client device. Metadata is the actual definition of the application and how it behaves. The application definition is comprised of Business Objects, Business Object Properties, Business Object Rules and Business Constants. Business Objects are individual components of the system that are broken up into logical pieces of business units such as Customers, Orders, Products, and Product Issues. A Business Object Property is a specific attribute of a given Business Object such as a Customer First Name, Last Name, Address and SSN, or another Business Object. Business Rules are individual pieces of logic that are applied to a Business Object to help control the behavior and state of the object, (e.g., placing an Order for a platinum Customer automatically gets overnight shipping for Free). Business Rules are typically written in VS.NET code, such as C# or VB.NET code. Business Constants help control and determine the outcome and criteria for a given Business Rule such as the customer type has to be Platinum, Gold, or Silver to get overnight shipping. These business constants are used in the Business Rules to determine the outcome of applying a rule to data. During subscription, the Metadata is downloaded to the device and then inserted into the stored Metadata file. Then as an application makes a request for a Business Object, the client ("Dexterra Smartclient") retrieves the definition of the Business Object from Metadata and processes the request from the application to the local data store. This allows for quick and easy creation of the Business Objects on the fly by the applications at runtime. Thus, when a Business Object is requested, its definition is retrieved from the local store (Metadata) and it is created (instantiated) at run time, in accordance with the Metadata values and data request.

The Customer Data Definition is the schema that the Customer Business Data is going to be stored in a (e.g., a relational database file) Customer Business Data store on the device. The schema is translated into views on the Dexterra Server, which correspond to either tables on a customers database or objects exposed through their APIs. During the Subscription process the Dexterra Server sends down to the client device the schema definition, defined by the views as and SQL Create Schema statements which the device then executes to create the database definition on the client device. The Business Object definitions then contain information on how to retrieve data out of the database to allow the application to operate. The schema is by default defined from the customer's backend system, and then directly delivered to the client device. In cases where the schema cannot be obtained from the backend system, system administrators have the ability to describe the schema that corresponds to the backend system.

The Customer Business Data is the actual data stored in the backend system, which is then downloaded onto the client device during the subscription process and then inserted into the tables that are created in the Customer Business Data file during the creation of the Customer Data Definition. This data gives the end-user a basis to begin using the application and allows the customer to update data and download only the changes that have occurred on the Server since the last time they downloaded latest data or subscribed to the application. The Business Rules of the application will determine the frequency with which the client device will initiate operations such as data upload requests and the like. Thus, client data update operations might commence once daily, in accordance with operational thresholds, or according to other requirements, as specified by the Business Rules for an application. As noted above, the server will check for application updates with every client device communication to the server. At the server, Business Rules executing at the server will determine if an application upgrade is mandatory or optional.

The files/assemblies of the application are the compiled components/libraries that make up the application. They are downloaded to the client device during the subscription process or during an update process and allow for easy deployment of the application to customers' client devices. The end-user auto-installs a Client Framework, after which the user is automatically taken through a process to download application definitions and the physical files that make up the application. This reduces the amount of effort (e.g., IT expenditures) required to support and handle installation of applications on individual devices.

One aspect of subscribing to applications is limiting the end-user to only the data that is needed to complete and satisfy the user's individual job function. While the Dexterra Application Server can have any number of applications running on it, the end-user only desires to download those applications that are pertinent to his or her job. Implementing such context-sensitive download involves only downloading the metadata/business objects that are used by a specific application, instead of all those that are defined on the Dexterra Server and otherwise available. Such limited, context-sensitive downloads are achieved by the server relating the objects specified in the Metadata and retrieving them for the associated applications, so that only objects specified in Metadata are returned to the client device.

When it comes to creating the Customer Data Definition, only the tables and columns that are needed by the Business Objects are created. This prevents unnecessary tables and columns from being created on the device and reduces the amount of space and processing power the data consumes on the device.

When downloading Customer Business Data, filters are applied on the server side during Subscription or an Update (Get Latest operation). This allows end-users 316 to only download data that is important to them for that given day or time period, instead of downloading data that the end-user would not use. Filters are a means to reduce the stress and pressure that remote/mobile solutions might put onto a customers backend system. Instead of having to make complete copies of the customer backend data, small subsets of data are downloaded onto the device 316 to improve performance and enable real time data access and thus provide the end-user with the data they care about, in a timeframe that is relevant. An example of this might be a Sales Representative who works in the state of California. This Representative wouldn't want to download contacts and sales forecast information for the state of New York. Downloading contacts and sales forecast information for the state of New York would only increase the amount of time to download and update the data between the device and the server, add unnecessary data to the client device and increase the amount of data that the customers backend system has to process. Filters are defined according to their connector type, so that filters for RDBMS connectors are defined by SQL statements, and filters for other datastores are defined by scripts and API calls.

B. Change Management

Change Management processing occurs every time the client device 316 makes a request to the Dexterra Application Server 314 for communication. When the client device initiates communication with the Dexterra Server, the server analyzes information from the client to check for application version number. If desired, the server also can check the data to ensure that the data is in the expected format. The server will compare the received version number of an application against any update packages available for that application. The update package will comprise the files and data necessary for an update of the application to the current version. The client can provide application version information for all applications installed at the client device, not just the application for which a particular communication requested is transmitted.

If the server finds an old application version number on checking the information received from the client device, or if the server finds that the data is not in the correct format for current versions, the server notifies the end-user that their system is out of date, and that they should update the application either at that moment or another time better suited to their wireless (or network) conditions. If the application update or upgrade is indicated as mandatory, then the server can initiate update processing to download and install the update package without user involvement or intervention. The process of updating applications ensures that any changes in Metadata, Customer Data Definition, Customer Business Data, and Application Assemblies are downloaded onto the client device, to ensure that the application operates correctly.

C. Deployment Model

The deployment model is the process in which the various applications and their files are deployed to the client device 316 for ease of distribution and installation. This process happens seamlessly during the subscription or update application process, as described above. Data is updated as well as applications. Even if there are new changes to assemblies in an application, the client device 316 will recognize it automatically, and request to download them from the server 314.

The present invention has been described above in terms of a presently preferred embodiment so that an understanding of the present invention can be conveyed. There are, however, many configurations for mobile enterprise data systems not specifically described herein but with which the present invention is applicable. The present invention should therefore not be seen as limited to the particular embodiments described herein, but rather, it should be understood that the present invention has wide applicability with respect to mobile enterprise data systems generally. All modifications, variations, or equivalent arrangements and implementations that are within the scope of the attached claims should therefore be considered within the scope of the invention.

We claim:

1. A method of change management for a mobile data system having a mobile client device that shares data with multiple enterprise data sources via a server of the system, the method comprising:

receiving, by the server, from the mobile client device a subscription request as part of a subscription process to determine which applications are deemed accessible and permissible to the mobile client device, and in response to the subscription request the server provides to the mobile client device a list of such applications after the server has authenticated the mobile client device through a validation process between the mobile client device and the server, and in further response to a selection request from the mobile client received by the server for one or more of the applications from the list of applications provided by the server to the mobile client, appropriate client framework data is downloaded by the server to the mobile client device for the initial installation of the selected one or more applications where any applications previously downloaded in the mobile client device are overwritten, and a validation process occurs between the server and enterprise data sources to provide access to enterprise data sources;

downloading, by the server, onto the mobile client device, as part of the subscription process, metadata, customer data definition, and customer business data associated with the list of available applications in response to the subscription request from the mobile client device and said server also downloads files that enable the downloaded applications to run on the mobile client device where the customer business data is data stored in the enterprise data sources and during the downloading of the customer business data, the server applies filters to allow pertinent customer business data to be downloaded;

storing, by the server, as part of the subscription process, the selected one or more applications onto the mobile device and the server further storing the metadata into a relational database file of the mobile client device, said metadata being actual definitions of the one or more applications and how they behave, where such definitions comprise business objects, business object properties, business object rules, and business constants, where said business objects are components on the system broken up into logical pieces, said business object properties are specific attributes of given business objects, said business object rules are individual pieces of logic that are applied to corresponding business objects to help control state and behavior of an object, and said business constants help control and determine outcomes and criteria of the business object rules and where the downloaded customer business data are actual data stored in the multiple enterprise data sources and further where the server stores the downloaded customer business data;

receiving, by the server, a communication request from the mobile client device to establish communications with the server of the mobile data system, wherein the communication request includes data that identifies one or more applications already installed at the mobile client device where at least a portion of the one or more of the applications already installed at the mobile client device resulted from the subscription process;

determining, by the server, if an update package is available for the identified one or more applications at the mobile client device; and downloading, by the server, the update package to the mobile client device as a result of an update operation performed by the mobile client device and where the server uploads data records from the mobile client device after the server has performed a conflict detection process, a conflict determination process and a conflict resolution process.

2. A method as defined in claim 1, wherein the subscription process is an initial subscription process.

3. A method as defined in claim 1, wherein determining if an update package is available comprises:

determining a version number for the identified application installed at the mobile client device;

identifying an update package for the identified application; and installing the update package at the mobile client device to replace a previous version of the identified application.

4. A method as defined in claim 3, wherein determining a version number comprises receiving data from the mobile client in a predetermined format for the identified application and determining the version number in accordance with the data format.

5. A method as defined in claim 1, wherein the communication request identifies all installed applications at the mobile device.

6. A method of operating a mobile client device in a mobile data system in which the client device shares data with multiple enterprise data sources via a server of the system, the method comprising:

transmitting, by the mobile client, a subscription request to the server of the mobile data system thus initiating a subscription process to determine and identify which applications are deemed accessible and permissible to the mobile client device, and after an authentication and validation process between the server and the mobile client device, in response to the subscription request the mobile client device receives from the server a list of such applications and in response to receiving the list of applications from the server, the mobile client device sends a selection request to the server for one or more of the applications from the list of applications provided by the server to the mobile client, and further where appropriate client framework data is then received, by the mobile client device from the server, for the installation of the selected one or more applications and any applications previously received by the mobile client device are overwritten, and a validation process occurs between the server and enterprise data sources to provide access to enterprise data sources;

receiving, by the mobile client device, from the server, as part of the subscription process, metadata, customer data definition, and customer business data associated with the list of available applications in response to the subscription request from the mobile client device and the mobile client device, and where the mobile client device also receives files that enable the downloaded applications to run on the mobile client device where the customer business data is data stored in the enterprise data sources and during the downloading of the customer business data, the server applies filters to allow pertinent customer business data pertinent to be downloaded;

receiving, by the mobile, client device, as part of the subscription process, the selected one or more applications, and the mobile client further receiving the metadata into a relational database file of the mobile client device, said metadata being actual definitions of the one or more applications and how they behave, where such definitions comprise business objects, business object properties, business object rules, and business constants, where said business objects are components on the system broken up into logical pieces, said business object properties are specific attributes of given business objects, said business object rules are individual pieces of logic that are applied to corresponding business objects to help control state and behavior of an object, and said business constants help control and determine outcomes and criteria of the business object rules and where the downloaded customer business data are actual data stored in the multiple enterprise data sources and further where the server stores the downloaded customer business data;

transmitting by the mobile client device, a communication request to the server to establish communications with the server, wherein the communication request includes data identifying one or more of the applications already installed at the mobile client device and where at least a portion of the one or more of the applications already installed at the mobile client device resulted from a the subscription process; and receiving, by the mobile client device, an update package from the sever as a result of an update operation performed by the mobile client device where the mobile uploads data records to the server after the server has performed a conflict detection process, a conflict determination process and a conflict resolution process.

7. A method as defined in claim 6, wherein the communication request includes data from the mobile client in a predetermined data format for the identified application and thereby determines a version number of the identified application.

8. A method as defined in claim 6, wherein the communication request identifies all installed applications at the mobile client device.

9. A method as defined in claim 6, wherein the subscription process comprises:
   sending user identifying information to a network location;
   selecting the identified application for installation;
   downloading a Client Framework for the identified application; and
   receiving data comprising at least one from the group of Metadata, Customer Data Definition, Customer Business Data, and runtime files for the identified application, wherein the received data is overwritten to any prior corresponding application files previously installed at the mobile client device.

10. A server for use in a mobile data system in which a mobile client device shares data with multiple enterprise data sources through communications with the server, the server comprising:
   a wireless communication interface that enables communication with the mobile client device; and
   a processor that operates so as to receive a subscription request from the mobile client device as part of a subscription process to determine which applications are deemed accessible and permissible to the mobile client device, and in response to the subscription request the processor provides to the mobile client device a list of such applications after the processor has authenticated the mobile client device through a validation process between the mobile client device and the processor, and in further response to a selection request from the mobile client received by the processor for one or more of the applications from the list of applications provided by the processor to the mobile client, appropriate client framework data is downloaded by the processor to the mobile client device for the initial installation of the selected one or more applications where any applications previously downloaded in the mobile client device are overwritten, and a validation process occurs between the processor and enterprise data sources to provide access to enterprise data sources;
   the processor being further configured to download onto the mobile client device, as part of the subscription process, metadata, customer data definition, and customer business data associated with the list of available applications in response to the subscription request from the mobile client device and said processor also downloads files that enable the downloaded applications to run on the mobile client device where the customer business data is data stored in the enterprise data sources and during the downloading of the customer business data, the processor applies filters to allow pertinent customer business data to be downloaded;
   the processor also configured to store, as part of the subscription process, the selected one or more applications onto the mobile device and the processor further stores the metadata into a relational database file of the mobile client device, said metadata being actual definitions of the one or more applications and how they behave, where such definitions comprise business objects, business object properties, business object rules, and business constants, where said business objects are components on the system broken up into logical pieces, said business object properties are specific attributes of given business objects, said business object rules are individual pieces of logic that are applied to corresponding business objects to help control state and behavior of an object, and said business constants help control and determine outcomes and criteria of the business object rules and where the downloaded customer business data are actual data stored in the multiple enterprise data sources and further where the server stores the downloaded customer business data;
   the processor is further configured to receive a communication request from the mobile client device to establish communications with the server of the mobile data system, wherein the communication request includes data that identifies one or more applications already installed at the mobile client device where at least a portion of the one or more of the applications already installed at the mobile client device resulted from the subscription process, where said processor then determines if an update package is available for the identified one or more applications at the mobile client device; and where the processor downloads the update package to the mobile client device as a result of an update operation performed by the mobile client device after the server has performed a conflict detection process, a conflict determination process and a conflict resolution process.

11. A server as defined in claim 10, wherein the server determines if an update package is available by determining a version number for the identified application installed at the mobile client device, identifying an update package for the identified application, and sending the update package to the mobile client device to replace the previous version of the identified application.

12. A server as defined in claim 11, wherein the server determines a version number by receiving data from the mobile client in a predetermined format for the identified application and determines the version number in accordance with the data format.

13. A server as defined in claim 10, wherein the received communication request identifies all installed applications at the mobile client device.

* * * * *